(12) United States Patent
Mi et al.

(10) Patent No.: US 7,530,721 B2
(45) Date of Patent: May 12, 2009

(54) DOUBLE-SIDED TURNING FILM

(75) Inventors: Xiang-Dong Mi, Rochester, NY (US); Richard D. Bomba, Rochester, NY (US); Robert P. Bourdelais, Pittsford, NY (US); Michael L. Ferranti, Holley, NY (US); Jehuda Greener, Rochester, NY (US); Louis P. Harasta, Jr., Webster, NY (US); Herong Lei, Webster, NY (US); Stephen C. Meissner, West Henrietta, NY (US); Steven J. Neerbasch, Rochester, NY (US); Robert L. Walton, Fairport, NY (US); John M. Palmeri, Hamlin, NY (US); Tomohiro Ishikawa, Evanston, IL (US)

(73) Assignee: SKC Haas Display Films Co., Ltd., Choongchungnamdo (KR)

(*) Notice: Subject to any disclaimer, the term of this patent is extended or adjusted under 35 U.S.C. 154(b) by 22 days.

(21) Appl. No.: 11/736,735

(22) Filed: Apr. 18, 2007

(65) Prior Publication Data
US 2008/0259634 A1 Oct. 23, 2008

(51) Int. Cl.
*F21V 7/04* (2006.01)
(52) U.S. Cl. .............. 362/606; 362/607; 362/618; 362/619; 362/620; 362/622; 362/624; 362/625; 362/626; 362/627
(58) Field of Classification Search .............. None
See application file for complete search history.

(56) References Cited

U.S. PATENT DOCUMENTS

| | | | |
|---|---|---|---|
| 5,126,882 A | 6/1992 | Oe et al. | |
| 5,600,462 A | 2/1997 | Suzuki et al. | |
| 5,854,872 A | 12/1998 | Tai | |
| 6,222,689 B1 | 4/2001 | Higuchi et al. | |
| 6,576,887 B2 | 6/2003 | Whitney et al. | |
| 6,628,460 B1 | 9/2003 | Ookawa et al. | |
| 6,669,350 B2 | 12/2003 | Yamashita et al. | |
| 6,707,611 B2 | 3/2004 | Gardiner et al. | |
| 6,746,130 B2 | 6/2004 | Ohkawa | |
| 7,201,510 B2* | 4/2007 | Yamashita et al. | 362/617 |
| 7,330,315 B2* | 2/2008 | Nilsen | 359/640 |
| 2005/0184426 A1 | 8/2005 | Bomba et al. | |
| 2005/0276071 A1 | 12/2005 | Sasagawa et al. | |
| 2006/0209428 A1 | 9/2006 | Dobbs et al. | |
| 2006/0210770 A1 | 9/2006 | Nelson et al. | |
| 2007/0002583 A1* | 1/2007 | Lee et al. | 362/606 |

FOREIGN PATENT DOCUMENTS

| WO | 2005025837 | 3/2005 |
|---|---|---|
| WO | 2005025845 | 3/2005 |

OTHER PUBLICATIONS

T. Ishikawa, et al., "P-82: New Design for a Highly Collimating Turning Film", SID Digest, 2006, pp. 514-517.

* cited by examiner

*Primary Examiner*—Sandra L O'Shea
*Assistant Examiner*—Danielle Dunn
(74) *Attorney, Agent, or Firm*—Edwin Oh

(57) ABSTRACT

A backlight device for a display comprising (1) a side-lit light source, (2) a light guide plate and (3) a turning film comprising a light entry and a light exit surface comprising lenticular elements on the exit surface and prismatic structures on the entry surface, wherein the average values of the parameters of the features and the thickness of the film are selected to provide a peak output angle of ±10° from normal to the light exit surface of the light guide plate and an optical gain of at least 1.25. Also disclosed are methods of making the turning film and a display incorporating the backlight.

23 Claims, 30 Drawing Sheets

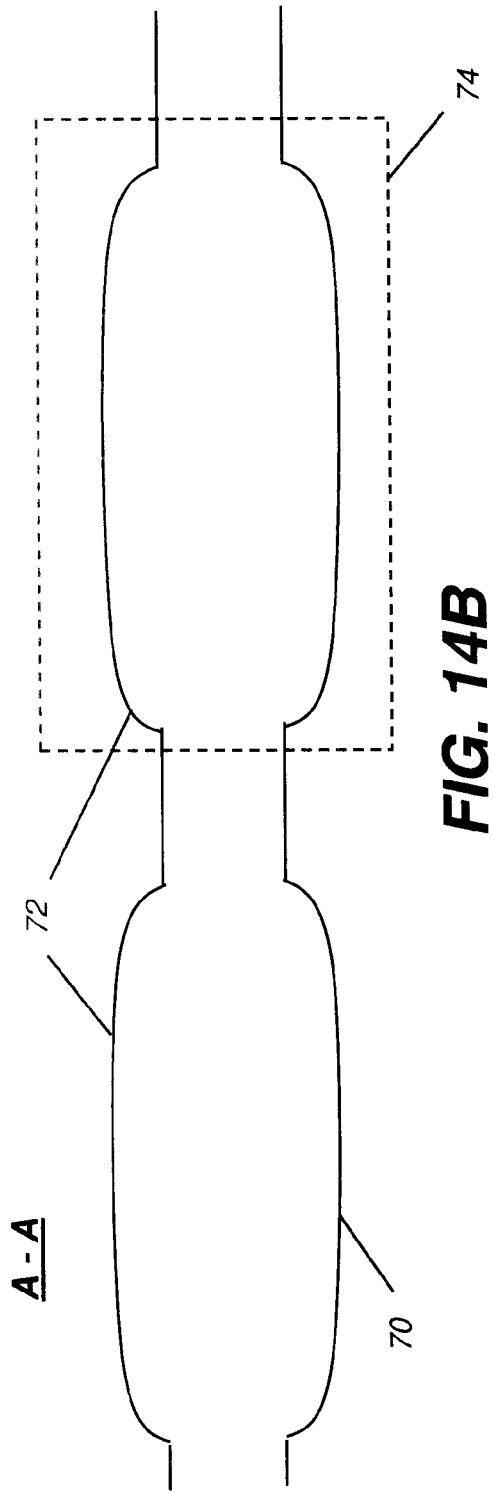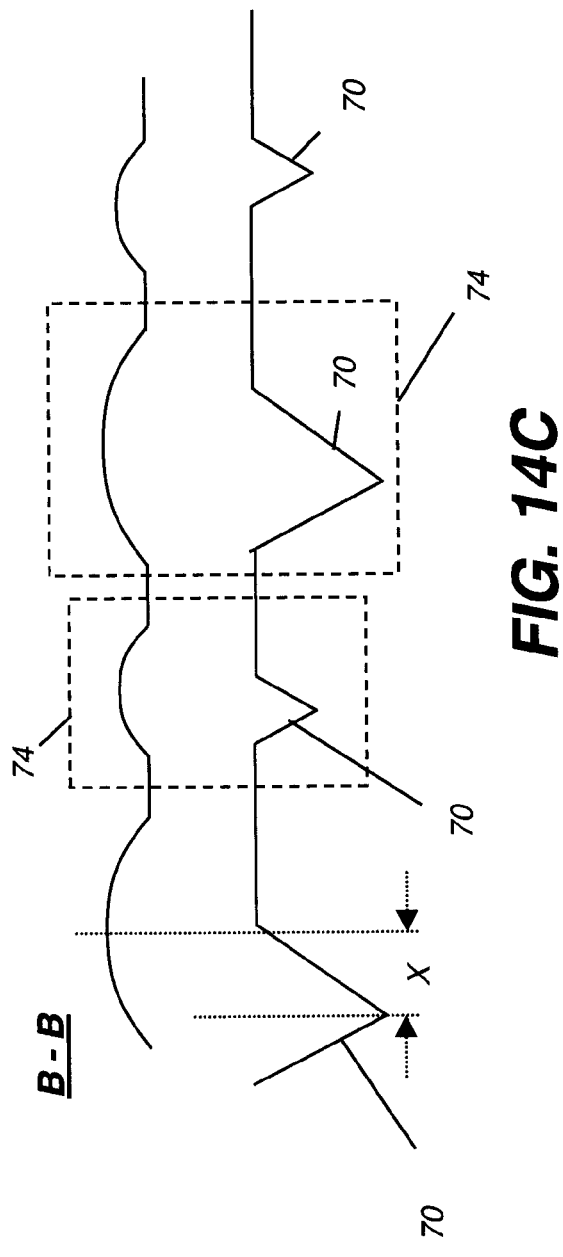

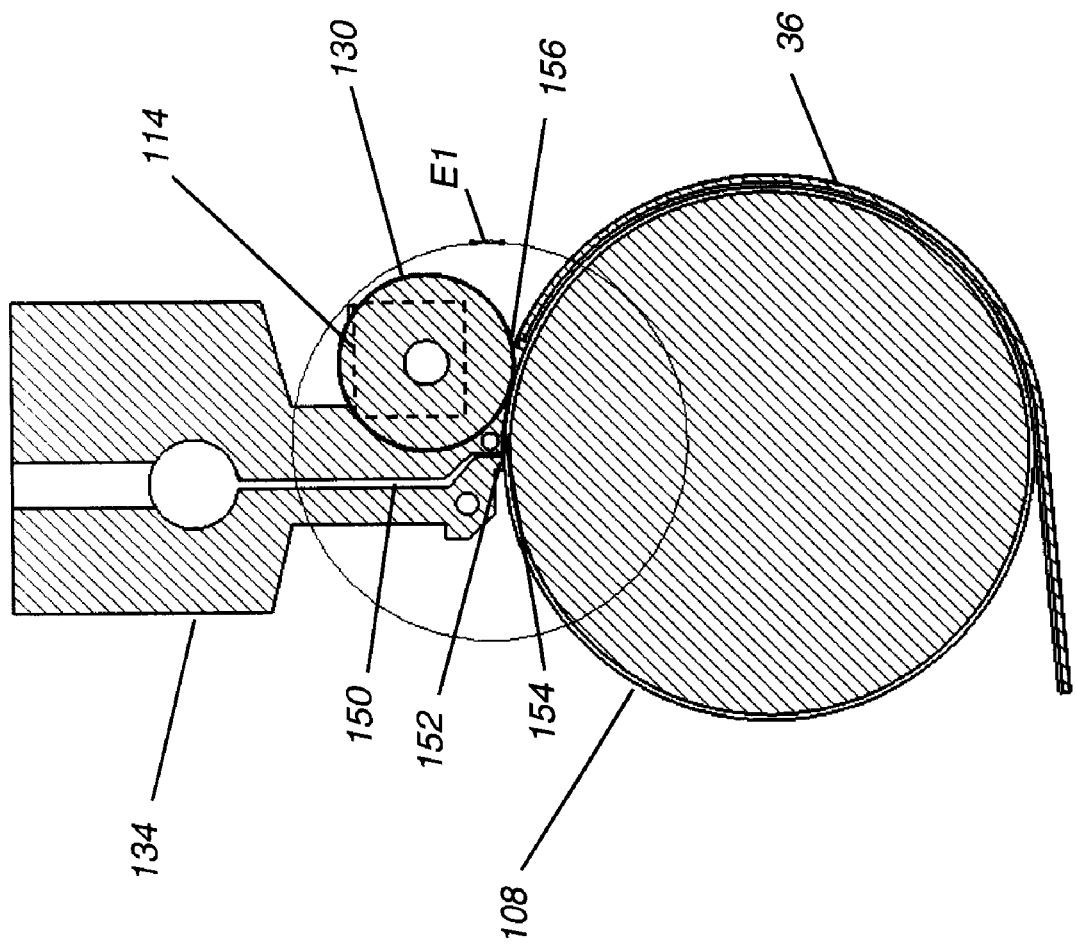

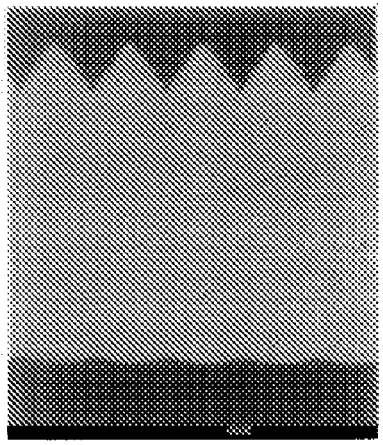
*FIG. 24A*
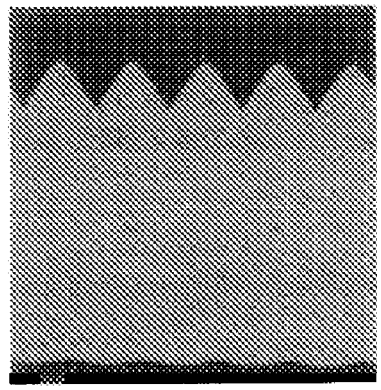
*FIG. 24B*
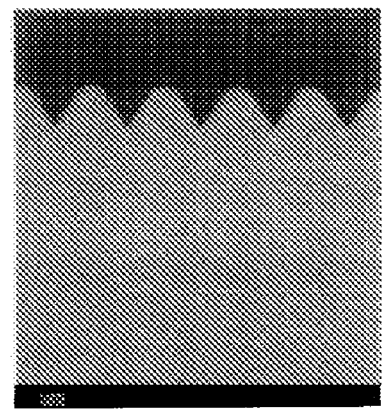
*FIG. 24C*
*FIG. 24D*

DOUBLE-SIDED TURNING FILM

CROSS REFERENCE TO RELATED APPLICATIONS

Reference is made to commonly-assigned copending U.S. Patent Application Publication No. US20044786858A, filed Feb. 25, 2004, entitled RADIAL CONTACT EXTRUSION DIE, by Bomba et al., the disclosure of which is incorporated herein.

FIELD OF THE INVENTION

This invention generally relates to display illumination for enhancing luminous intensity from a turning film and more particularly from a turning film having microstructures on both surfaces.

BACKGROUND OF THE INVENTION

Portable Liquid Crystal Displays (LCDs) that are used for laptop computers and other personal computing and communication devices require a backlighting unit that is compact and relatively efficient. In many single-viewer applications of LCD displays, only a narrow viewing angle is required. By providing illumination directed primarily toward the viewer, that is, in a normal direction, an efficient backlighting unit meets this need and requires less energy, thus conserving battery power. In addition, narrow viewing angle LCDs safeguard privacy, which can be critical when the LCDs are used in public.

One solution for providing illumination of the required type uses light from a lamp that is directed into a Light Guid Plate (LGP), typically in combination with one or more types of films for redirecting and conditioning the light. Different types of LGP have been developed for this purpose. Some types of LGPs use printed dots or other surface-scattering mechanisms to provide scattered, diffused light over a broad range of angles. Other types of LGPs are tapered or wedge-shaped and use Total Internal Reflection (TIR) to provide output light that is generally collimated, with a dominant ray or principal ray that is at a relatively large angle relative to normal. Taking advantage of both approaches, the CLAREX® HSOT (Highly Scattering Optical Transmission) light guide panel available from Astra Products, Baldwin, N.Y., uses a type of LGP that employs some forward-scattering to provide generally uniform backlighting, and is tapered at the same time to provide illumination that is angularly biased away from normal. To redirect this light toward the viewer, the HSOT light guide panel employs a directional turning film.

In illumination apparatus that uses a conventional turning film, surface or volume scatterers are typically used in combination with a wedge angle in order to extract light that is already somewhat collimated in the direction parallel to the tubular Cold-Cathode Fluorescent Light (CCFL) source. Using the mechanism of frustrated Total Internal Reflection (TIR), the wedge-shaped light guide provides light, at a glancing angle relative to the light guide surface, to a turning film. HSOT light guide panels and similar types of directional turning films use arrays of prismatic structures, arranged in various combinations, to redirect light exiting from a light guiding plate toward normal, that is, the 0-degree direction, relative to the two-dimensional surface.

Referring to FIG. 1, the overall function of a light guiding plate 10 in a display apparatus 30 is shown. Light from a light source 12 is incident at an input surface 18 and passes into tapered light guiding plate 10. The light propagates within light guiding plate 10 until Total Internal Reflection (TIR) conditions are frustrated and then, possibly reflected from a reflective surface 42, exits light guiding plate 10 at an output surface 16. Relative to normal N, the exit angle of light from light guiding plate 10 is fairly large, typically in the range from about 40 to 88 degrees. This light then goes to a turning film 22 and is redirected toward normal to illuminate a light gating device 20 such as an LCD or other two-dimensional backlit component.

For distributing the light along a two-dimensional surface, light guiding plate 10 and its support components are typically designed to provide both redirection of the light and some amount of collimation that reduces divergence of the beam angle. For example, U.S. Pat. No. 5,854,872 entitled "Divergent Angle Rotator System and Method for Collimating Light Beams" to Tai discloses a light guiding plate that uses an array of elongated microprisms to redirect and collimate light from one or more light sources. In the device disclosed in the Tai '872 patent, the light guiding plate has a first set of prismatic structures on the light output side elongated in one direction to provide collimation and a second set of prismatic structures on the opposing side elongated in the orthogonal direction and providing collimation and TIR reflection. There are a number of variations applied to this basic arrangement. For example, U.S. Pat. No. 6,576,887 entitled "Light Guide for use with Backlit Display" to Whitney et al. discloses a light guide optimized for uniformity, in which structures on the output surface of a turning film 22 may be randomly distributed to provide a more uniform output. U.S. Pat. No. 6,707,611 entitled "Optical Film with Variable Angle Prisms" to Gardiner et al. discloses adaptation of an optical turning film with an arrangement that reduces perceived ripple.

Turning films are described, for example, in U.S. Pat. No. 6,222,689 entitled "Surface Light Source Device and Asymmetrical Prism Sheet" to Higuchi et al.; in U.S. Pat. No. 5,126,882 entitled "Plane Light Source Unit" to Oe et al.; and in U.S. Pat. No. 6,746,130 entitled "Light Control Sheet, Surface Light Source Device and Liquid Crystal Display" to Ohkawa. A number of approaches for optimizing the design of directional 2-D turning films are described in patent literature. For example, the '611 Gardiner et al. disclosure describes optimized geometric arrangements for the prism surface on the incident light surface of a turning film. U.S. Pat. No. 6,669,350 entitled "Planar Light Source System and Light Deflecting Device Therefor" to Yamashita et al. discloses an arcuate distribution of elongated prismatic structures on the incident light surface. U.S. Pat. No. 5,600,462 entitled "Optical Film and Liquid Crystal Display Device Using the Film" to Suzuki et al. discloses a conventional arrangement in which a turning film has elongated prismatic structures on the incident light surface and diffusing elements on the emitting light surface. For improving luminous intensity, however, this type of arrangement that employs both diffusing and light-directing elements in the same optical film is necessarily somewhat a compromise.

The conventional turning film redirects the incident light from light guiding plate 10 toward normal, over a small range of angles. Light outside this range is redirected at near-normal angles. One optimization strategy that has been used for expanding the range of angles of redirected light relates to prism geometry on the input side of turning film 22. FIG. 2A shows a small portion of turning film 22 in which prismatic structure 24 has a substantially isosceles shape in cross section. That is, on the input side of turning film 22, peak half-angle α equals peak half-angle β. For this and subsequent figures, the angle of a ray C for light emitted from turning film 22 is relative to normal N, as shown.

The graph of FIG. 2B shows the luminous intensity response relative to Normal (0 degrees) for a turning film 22 with this arrangement. An incident light luminous intensity curve 45 plots luminous intensity vs. angle for light that is output from the LGP and incident to turning film 22. As this curve shows, the light that is incident to turning film 22 is highly directional and has peak intensity at approximately 70 degrees from Normal (0 degrees). An output light luminous intensity curve 46 then shows the effect obtained at the output of turning film 22. Here, the intensity is substantially the same as the output from the LGP, but the angle is shifted, now centered around 0 degrees. This favorable shift of the angle toward normal helps to maximize the overall efficiency of the backlighting illumination system.

U.S. Pat. No. 6,222,689 entitled "Surface Light Source Device and Asymmetrical Prism Sheet" to Higuchi et al. discloses a turning film in which the relative sizes of peak half-angle α and peak half-angle β are unequal. A film of this type can provide improved performance when properly matched to the angle of incident light. FIG. 3A shows, in cross-sectional view, a small section of turning film 22 in which prismatic structure 24 has peak half-angle α less than peak half-angle β. FIG. 3B shows a typical luminous intensity curve 48 for light to each side of a 0 degree normal viewing angle using the altered geometry of FIG. 3A. As shown, luminous intensity increases on the order of greater than about 10% have been obtained using this angular adjustment. Other attempts to improve turning film performance by modifying the shape of prismatic structures, such as in U.S. Pat. No. 6,669,350 entitled "Planar Light Source System and Light Deflecting Device Therefor" to Yamashita, et al. for example, have provided moderate levels of improvement in luminous intensity.

The fabrication of double-sided optical films, including some types of turning films and various brightness enhancement articles, has been addressed in a number of ways. A number of approaches apply one or more coating materials to a moving web that acts as a carrier, using patterned rollers for forming the needed surface features. For example, U.S. Pat. No. 6,628,460 "Lens Sheet and Method for Producing the Same" to Ookawa et al. discloses a double-sided lenticular screen in which rows of lens structures on opposite incident and emitting surfaces of the screen extend in substantially parallel directions. For each side of the film, a curable resin is applied to a transparent substrate carrier, then shaped and cured to form light-redirecting elements. Other approaches that apply a curable polymer onto a transparent carrier are shown, for example, in U.S. Patent Application Publication No. 2006/0210770 entitled "Microreplicated Article with Defect-Reducing Surface" by Nelson et al.; in International Publication WO 2005/025837 entitled "Apparatus and Method for Producing Two-Sided Patterned Webs in Registration" by Huizinga et al.; and in U.S. Patent Application Publication No. 2006/0209428 entitled "Microreplicated Article with Moire Reducing Surface" by Dobbs et al.

Still other methods that have been used for fabrication of double-sided optical films include lamination. Separate sheets are formed having the features needed for opposite sides of the film. These sheets are then laminated onto a carrier or directly to each other to form the finished article. Embossing techniques can also be used to form a double-sided optical film onto a moving web.

Each of these conventional approaches, however, presents some problems, particularly where it is necessary to obtain precise registration of structures formed on opposite sides of the optical film. For applications using patterned rollers, such as those of the '460 Ookawa et al. or '9428 Dobbs et al. disclosures, close radial synchronization must be maintained between pairs of patterned rollers in order to make sure that features formed on each surface are in precise register. Lamination solutions can prove to be challenging, since the heat generated during lamination transfer can impact dimensional accuracy for the plastic sheet materials that are used.

With increased demands for more compact packaging of electronic display apparatus and for improved brightness efficiency, and with little promise of dramatic improvement to existing light-scattering approaches for backlight delivery, there is a compelling need for light redirection solutions that provide a high degree of collimation in order to significantly increase brightness in the display viewing direction. For implementation of these solutions, improved fabrication techniques are also needed. In particular, it is desired to have a backlight with a turning film that can provide light from a sidelight that provides a peak output angle of ±10° from normal to the LC cell and an optical gain of at least 1.25.

SUMMARY OF THE INVENTION

The invention provides a backlight device for a display comprising (1) a side-lit light source, (2) a light guide plate, and (3) a turning film comprising a light entry and a light exit surface comprising lenticular elements on the exit surface and prismatic structures on the entry surface, wherein the average values of the parameters of the features and the thickness of the film are selected to provide a peak output angle of ±10° from normal to the light exit surface of the light guide plate and an optical gain of at least 1.25. Also disclosed are embodiments of the backlight, methods of making the turning film and a display incorporating the backlight.

It is an advantage of the present invention that it can provide a more compact solution for displays than conventional brightness enhancement films provide, and combines functions of light collimation and light redirection from a single component.

It is a further advantage of the present invention that it provides improved levels of on-axis brightness for a light gating device.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 14B and 14C are cross-section views of the turning film of FIG. 14A; and

FIG. 20B is a cross-sectional view of the featured drums arrangement of FIG. 20A;

FIGS. 24A, 24B, 24C, 24D show microphotographs of double sided turning film made according to the present invention.

DETAILED DESCRIPTION OF THE INVENTION

Figure 1:
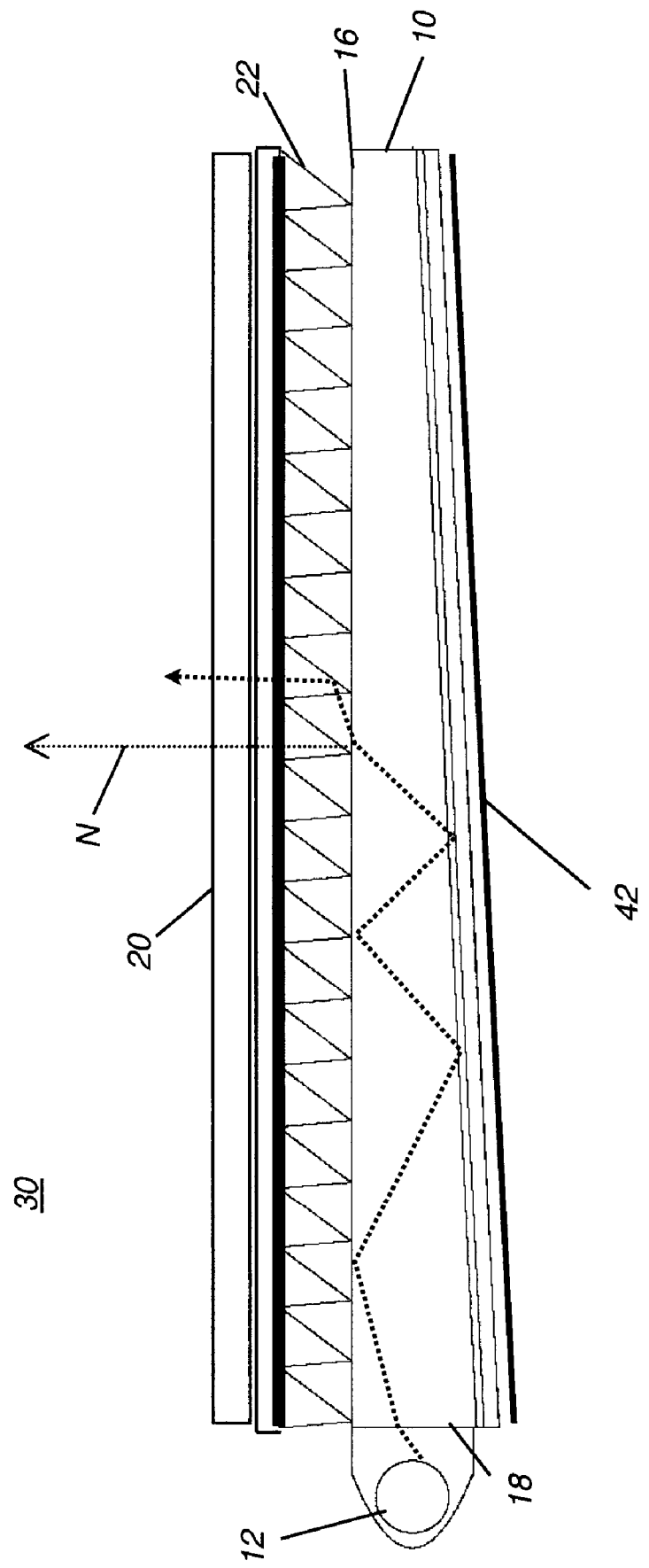
FIG. 1 is a block diagram side view showing the basic redirection function of an existing light guiding plate with separate collimation and redirection mechanisms.
Figure 2A:
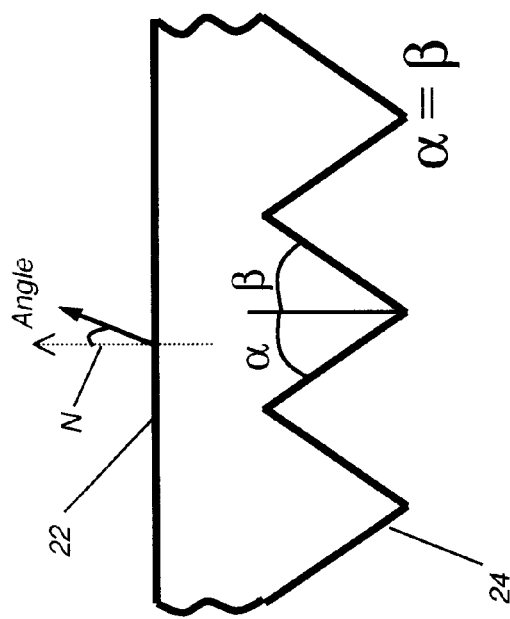
FIG. 2A is a cross-sectional side view showing a portion of a turning film.
Figure 2B:
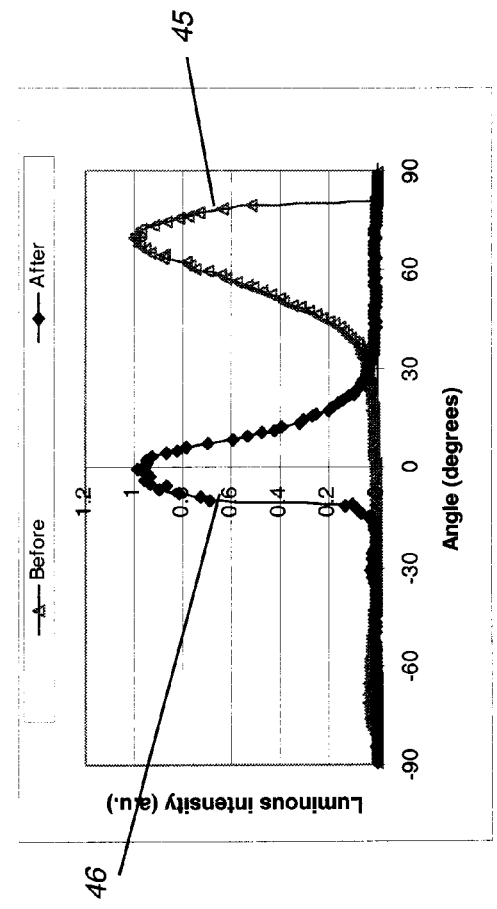
FIG. 2B is a graph showing luminous intensity response for the embodiment of FIG. 2A.
Figure 3B:
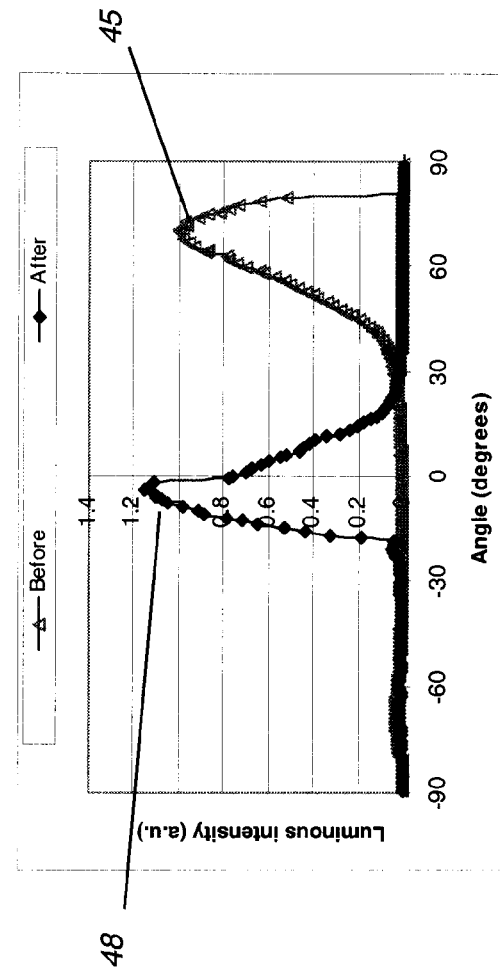
FIG. 3B is a graph showing luminous intensity response for the embodiment of FIG. 3A.
Figure 3A:
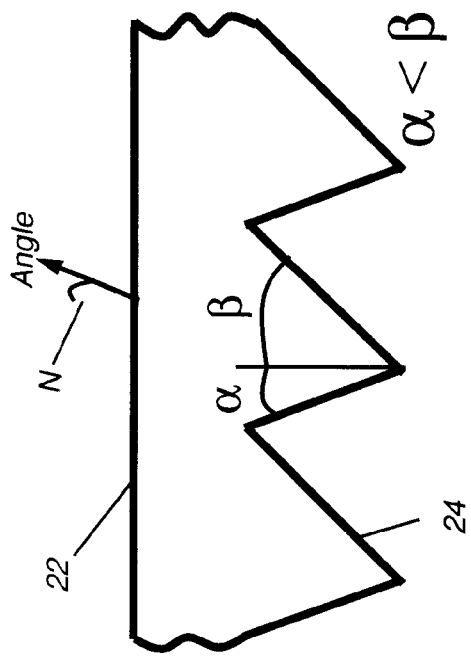
FIG. 3A is a cross-sectional side view showing a portion of a turning film.

The present description is directed in particular to elements forming part of, or cooperating more directly with, apparatus in accordance with the invention. It is to be understood that elements not specifically shown or described may take various forms well known to those skilled in the art.

The invention is represented in at least the following modes:

I. a backlight device for a display comprising (1) a side-lit light source, (2) a light guide plate, and (3) a turning film comprising melt-extrudable and thermo-formable polymeric material, the turning film comprising prismatic structures on the light entry surface of the film and lenticular elements on the light exit surface of the film, wherein:

(a) the prismatic structures are characterized by an average apex angle $(\alpha+\beta)$ and an average pitch (Q);

(b) the lenticular elements are characterized by an average pitch (P) and an average radius of curvature (R); and (c) the prismatic structures and lenticular elements are out of registration by an average amount (X), and (d) the film has average thickness (T);

provided that said averages are selected to provide a peak output angle of ±10° from normal to the LC cell and an optical gain of at least 1.25.

II. a backlight device for a display comprising (1) a side-lit light source, (2) a light guide plate and (3) a turning film comprising a light entry and a light exit surface comprising lenticular elements on the exit surface and prismatic structures on the entry surface, wherein (a) the prismatic structures are characterized by an apex angle $(\alpha+\beta)$ and an average pitch (Q);

(b) the lenticular elements are characterized by an average pitch (P) and an average radius of curvature (R); and (c) wherein the prismatic structures and lenticular elements are out of registration by an average amount X, (d) the thickness of the film is T;

provided that the averages are selected to provide a peak output angle of ±10° of normal and an optical gain of at least 1.25.

III. a carrierless method for producing a web having a pattern on each side comprising the steps of:

(a) heating the material for forming the web;

(b) pumping the material into a first cavity at a controlled rate;

(c) distributing the material in the first cavity over a length of a slot;

(d) forcing said material into a second cavity formed by a first external land surface, a second external land surface and a surface of a first roller to form a first pattern on the first surface of the web by partially solidifying said material under high-pressure; and (e) passing said partially solidified material through a nip formed between said first roller and a second roller to form a second pattern on the second surface of the web using pressure between the first and second rollers.

IV. a method for producing a web or sheet having aligned patterns of optical elements on opposite sides of the web comprising the steps of (a) forming on each side of a web patterns of optical elements aligned with each other and oriented in a machine direction, with or without using a carrier web;

(b) sampling the completed web to determine properties of the pattern of optical elements at various points across the width of the web;

(c) adjusting the alignment of the patterns of optical elements on the web as a result of the sampling.

V. a method for producing a web having a pattern on each side comprising:
 (a) forming a web with a first pattern on one surface using a curing process, wherein the first pattern is parallel to the machine direction;
 (b) melting a polymeric material for forming a second patterned surface;
 (c) pumping the material through an extrusion die forming a melt curtain at a controlled rate;
 (d) directing said material into a nip formed by a first roller and the web, and a second roller partially solidifying said material under high-pressure to form the second pattern on the opposing surface of the web wherein the second pattern is parallel to the machine direction; and
 (e) directing the web along the surface of one of the rollers while cooling and stripping the web when it has approximately reached the glass transition temperature of the polymeric material.

VI. a method for producing a web having a pattern on each side comprising:
 (a) forming the web with a first pattern on one surface using a curing process, wherein the first pattern is parallel to the machine direction;
 (b) forming a second pattern on the opposite surface using a curing process, wherein the second pattern is parallel to the first surface.

VII. a carrierless method for producing a web having a pattern on each side comprising the steps of:
 (a) heating the material for forming the web;
 (b) pumping the material into a first cavity at a controlled rate;
 (c) distributing the material in the first cavity over a length of a slot;
 (d) forcing said material into a second cavity formed by a first external land surface, a second external land surface and a surface of a first roller to form a first pattern on the first surface of the web by partially solidifying said material under high-pressure;
 (e) passing said partially solidified material through a nip formed between said first roller and a second roller to form a second pattern on the second surface of the web using pressure between the first and second rollers.

VIII. a carrierless method for producing a web having a pattern on each side comprising the steps of:
 (a) melting a polymeric material for forming the web;
 (b) pumping the material through an extrusion die forming a melt curtain at a controlled rate;
 (c) directing said material into a nip formed by a first roller and a second roller partially solidifying said material under high-pressure to form on each side of the web a pattern parallel to the machine direction; and
 (d) directing the web along the surface of one of the rollers while cooling and stripping the web when it has approximately reached the glass transition temperature of the polymeric material.

IX. a display comprising the foregoing backlights

Figures shown in this disclosure are provided to show overall structural geometry and principles of operation and fabrication and are not drawn with attention to scale. In some cases, relative scale may be exaggerated in order to better illustrate the apparatus and methods of the present invention. Exemplary dimensional data is provided in the text by way of example and not of limitation. Those skilled in the art will recognize that some dimensional variability can be provided and is within the scope of the present invention.

Most conventional turning films, such as that disclosed in the Higuchi et al. '689 patent cited in the background section above, employ a prism surface structure on the incident light side and have a flat surface on the opposite side of the film. As noted in the background section given above, modifications to this basic design have included changes to the output side of the film, including the use of a second prism surface orthogonally disposed with respect to the prismatic structure on the input side or use of diffusive structures on the output surface.

Figure 4A:
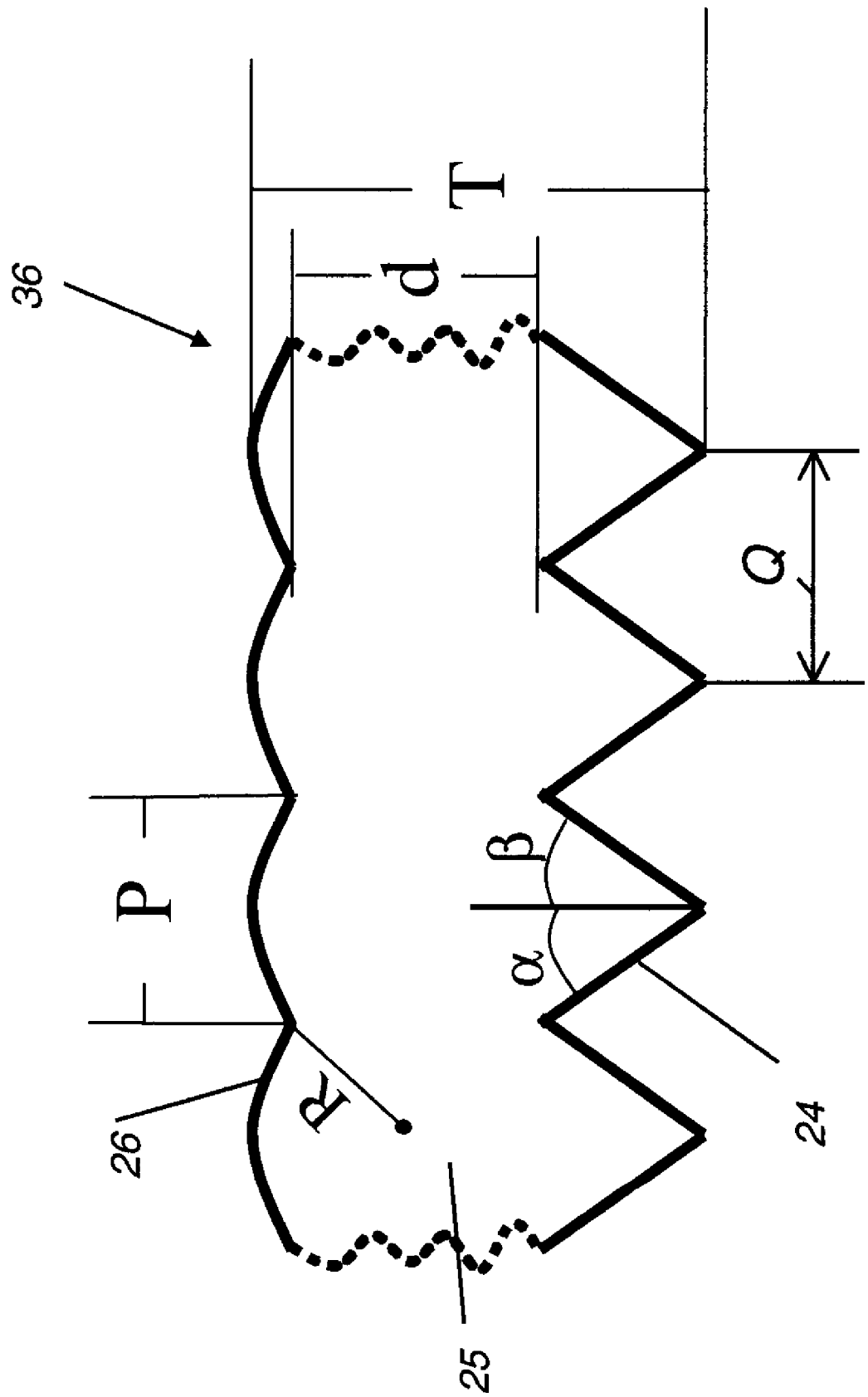
FIG. 4A is a cross-sectional side view showing a portion of a double sided turning film that does not have offset dimension according to the present invention.

The present invention takes a counter-intuitive approach to conventional redirection article design, providing a turning film with a combination of structures that employ both TIR and refractive conditioning of the incident light from a light guide plate to improve luminous intensity. Referring to FIG. 4A, there is shown a cross-sectional view of a small section of a turning film 36. In this embodiment, prismatic structure 24 on the redirecting input surface or light entry surface has peak half-angle $\alpha$ on the incident light surface essentially equal to peak half angle $\beta$; in general, however, angles $\alpha$ and $\beta$ need not be the same. Prismatic structure 24 is linearly elongated, with rows of prismatic structures 24 extending in a direction perpendicular to the page in the view of FIG. 4A. On the opposite light-emitting surface or light exit surface, lenticular elements 26 are linearly elongated in the same direction as prism 24 structures, that is, also perpendicular to the page.

From this cross-section view, prism 24 structures are spaced apart with a pitch Q.

Lenticular elements 26 are spaced apart with a pitch P. In the example of FIG. 4A, pitch P=Q. Typical dimensional values for these structures in one embodiment are as follows:
 R=75 µm;
 P=Q=50 µm;
 d=150 µm;
 $\alpha=\beta=33°$ The values are exemplary only, showing values suitable for some embodiments; other dimensional values may be better suited to specific applications of turning film 36. The half apex angles $\alpha$ and $\beta$ may be unequal, and in the range of 28° to 38°. The film core thickness d can be in a range of 50 µm to 350 µm. The height of the prismatic structures can also vary within 5 microns to create a stand-off from the light guide plate. In general, it is preferable to make pitch P as small as fabrication allows, typically in a range from about 15 to about 100 microns. The film may comprise one, two or three materials, that is, prismatic structure 24, a core layer 25, and lenticular elements 26 may or may not be the same material. In general, the prismatic structure has a low refractive index, and lenticular element 26 prefers a high refractive index. Typically, the refractive index of useful materials suitable for this turning film is in a range of approximately 1.2 to 1.9.

Figure 4B:
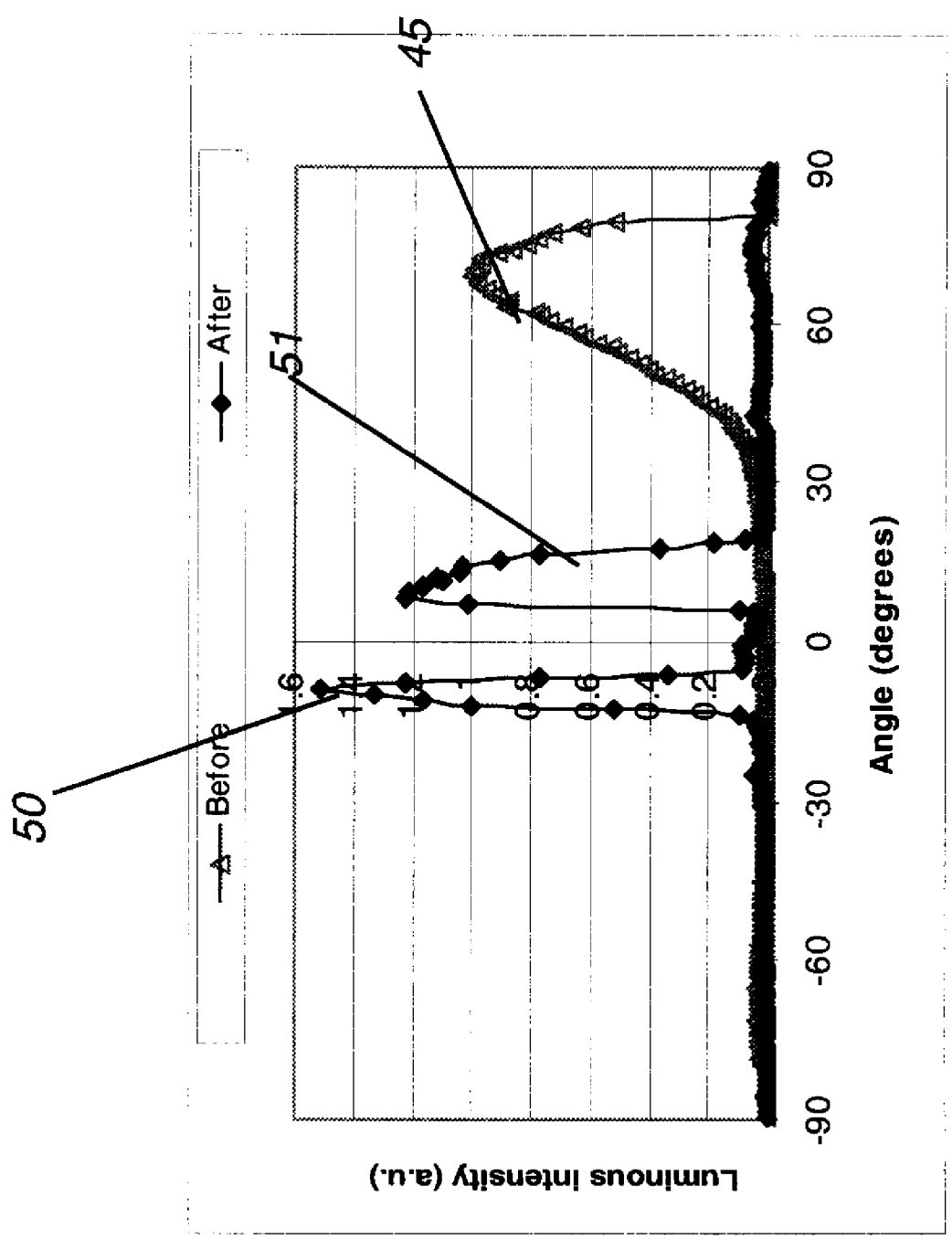
FIG. 4B is a graph showing luminous intensity response for the embodiment of FIG. 4A.

FIG. 4B shows a luminous intensity curve 50 for the embodiment of FIG. 4A. Luminous intensity curve 50 is characterized by improved luminous intensity gain (about 1.50) at near normal direction (about −8.5 degrees) over conventional turning films. However, as shown in FIG. 4A, there is an added crosstalk portion 51 centered at around +8.5 degrees. It would be advantageous to reduce the amount of light intensity in crosstalk portion 51 and redirect this light at angles that are nearer to normal.

Figure 7:
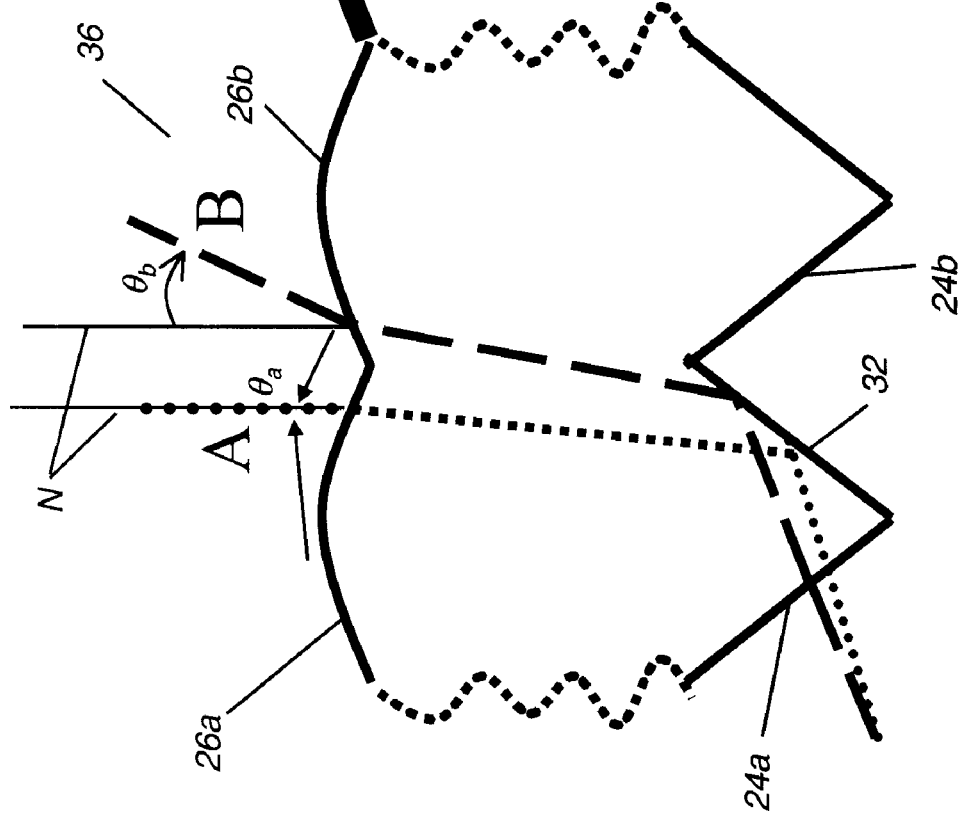
FIG. 7 is a side view showing paths of light causing crosstalk in one embodiment.

In general, optical crosstalk effects tend to deflect light from the desired normal output direction. In order to understand how the alternative of the present invention corrects for this type of crosstalk, it is first instructive to understand the crosstalk mechanism itself. Referring to FIG. 7, the paths of two incident light rays A and B from light guiding plate 10 are shown. Light at the angle of ray A is reflected from a side 32 of prismatic structure 24a and is thereby directed through lenticular element 26a, at a nearly normal exit angle $\theta_a$. Light at the angle of ray B, however, is at a slightly different angle with respect to side 32, further off normal by comparison with light at angle A. This light is reflected from side 32 of prismatic structure 24a and is thereby directed through lenticular element 26b. Exiting light of ray B is at an oblique angle $\theta_b$ with respect to normal, where, on average, angle $\theta_b$>>angle $\theta_a$. This causes at least some amount of optical crosstalk. The amount of crosstalk due to this behavior may be small, but is typically measurable, as was shown in the graph of FIG. 4B as crosstalk potion 51.

Figure 5A:
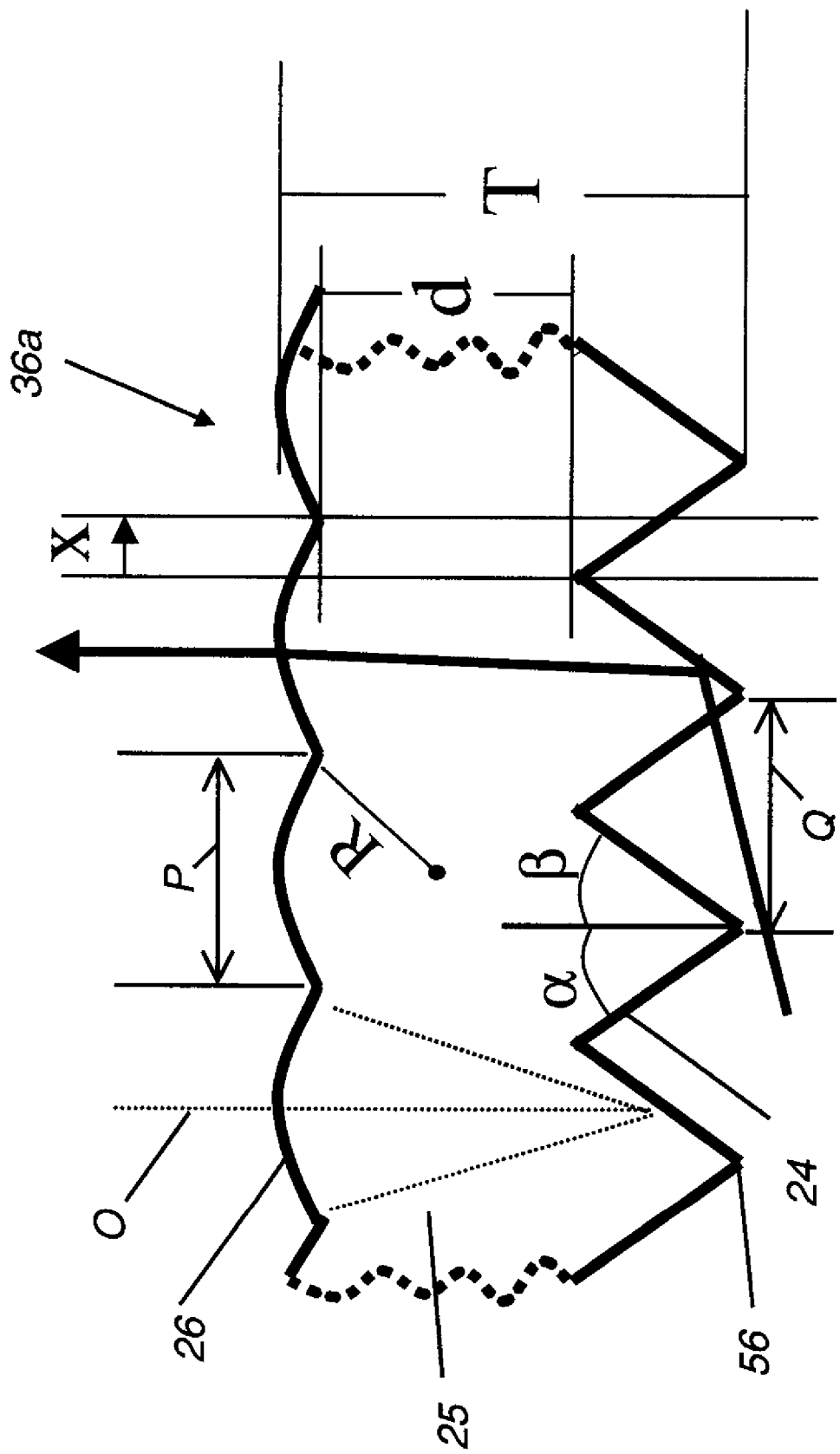
FIG. 5A is a cross-sectional side view showing a portion of a double sided turning film having a preferred offset dimension according to the present invention.

Referring to FIG. 5A, there is shown a cross-sectional view of a small section of a turning film 36a characterized by a preferred offset dimension X according to the present invention. By comparison of the turning film 36a with the turning film 36 that was shown in FIG. 4A, it can be observed that, while pitch dimensions P and Q remain the same between these embodiments and are essentially equal, the spatial registration between lenticular elements 26 and their paired prismatic structures 24 is shifted by an offset dimension X. For this embodiment:

$$X=10 \ \mu m \ (20\% \ of \ the \ periodicity \ P)$$

Offset dimension X can be considered as the extent out of registration of extended prismatic structures 24 and extended lenticular elements 26. Out of registration distance X is the distance by which an apex 56, the peak of prismatic structure 24, is spaced apart from an optical axis O of the nearest lenticular element 26, in line with the light propagation direction, from the cross-sectional perspective of FIG. 5A, or as the distance by which a groove of the prismatic structure 24, is spaced apart from the nearest groove of the nearest lenticular element 26, in line with the principal light propagation direction, from the cross-sectional perspective of FIG. 5A and FIG. 8. Each prismatic structure 24 is thus paired with a corresponding lenticular element 26, where there is a relative offset shift X between them. Offset dimension X can be varied over a range of dimensions; the optimal registration offset value for a given pitch arrangement can be calculated based on angular characteristics of light from light guiding plate 10 or may be determined empirically. In general, stated as a fraction of pitch P, the following would be a practical range for offset dimension X in many applications:

$$0.08P<X<0.65P$$

A more preferred range for the ratio X/P is between about 0.1 and 0.3.

It is noted that the turning film having offset dimension X/P is physically the same as the one having offset dimension −X/P, or 1−X/P. They differ from each other simply by a rotation of 180° around the film normal N. However, because of light output directionality from light guiding plate 10, the turning film having the offset dimension of value X functions differently than the one having offset dimension of values −X/P, or 1−X/P for a given light guiding plate having a specific light propagation direction. In all of the relevant figures, including FIGS. 1, 2A, 3A, 4A, 5A, 6, 7, 8, 9, 11A, and 13A, the light generally propagates from left to right, not from right to left.

Figure 8:
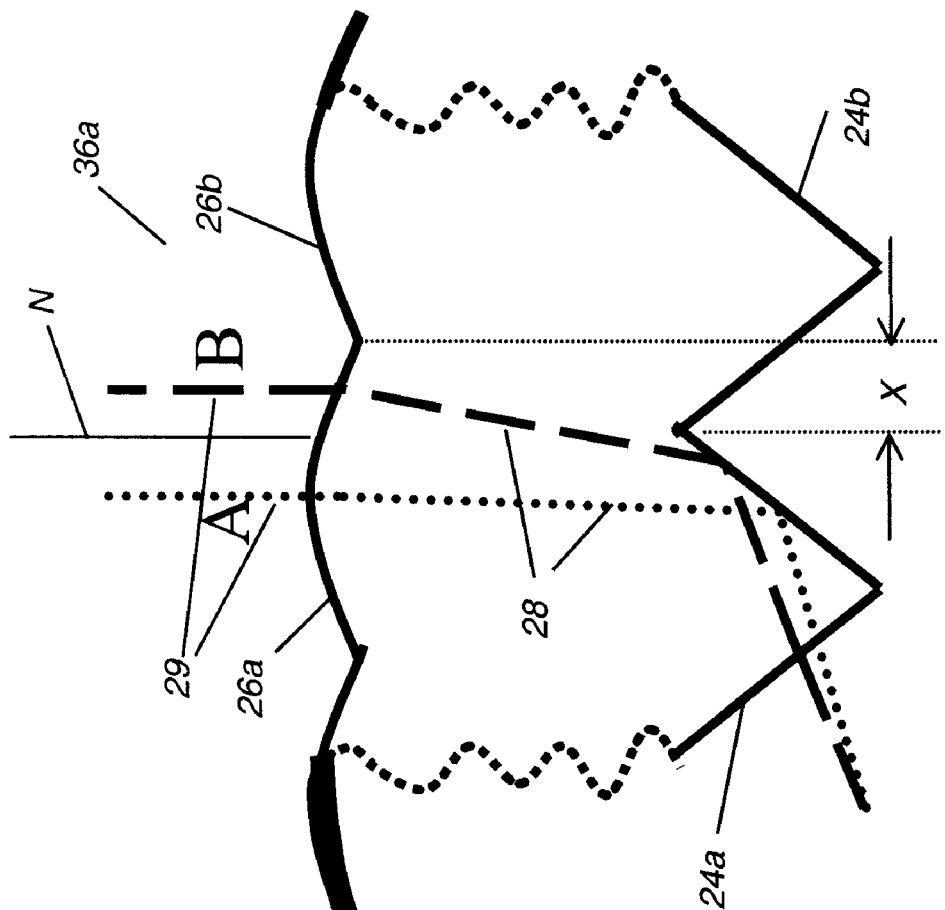
FIG. 8 is a side view showing paths of light with lens structures shifted in an alternate embodiment.

Referring to FIG. 8, an important effect of shifting lenticular elements 26 by offset dimension X is shown. By comparison with the light paths outlined in FIG. 7, light rays A and B are now both directed to the same lenticular element 26a. Therefore, both rays A and B are redirected substantially in the normal direction. Ray segment 28 indicates redirected light rays; ray segment 29 indicates the substantially collimated light rays. Because the pair of prismatic structure 24a and lenticular element 26a work together to redirect and collimate light rays A and B toward the targeted angle, which is near normal in this particular case, the offset dimension X is defined with respect to the corresponding prismatic structure 24a and lenticular element 26a in one pair. Similarly, the offset dimension can also be defined with respect to the corresponding prismatic structure 24b and lenticular element 26b in another pair.

Figure 5B:
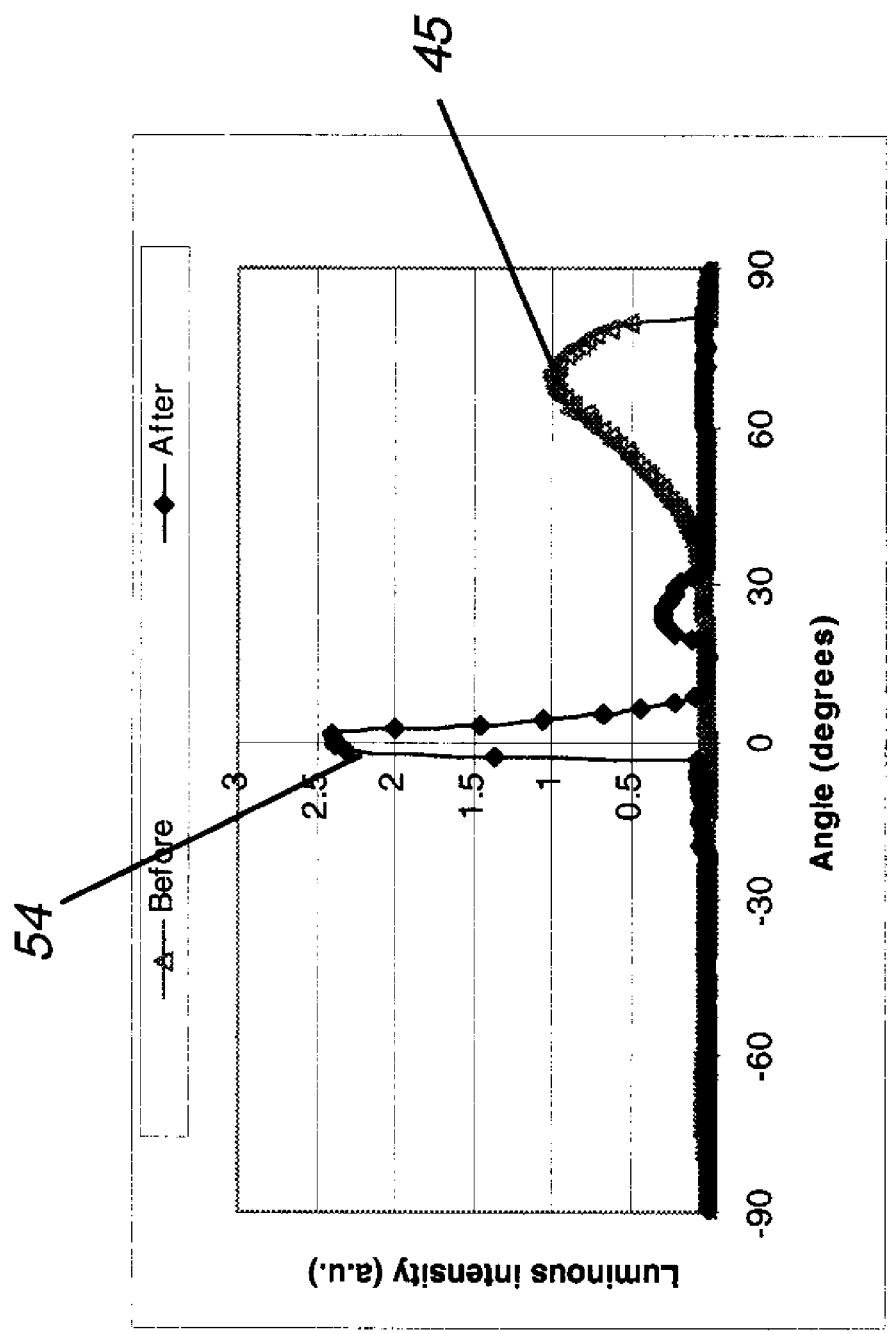
FIG. 5B is a graph showing luminous intensity response for the embodiment of FIG. 5A.

FIG. 5B shows a luminous intensity curve 54 for the offset arrangement of FIG. 5A. By comparison against luminous intensity curve 50 of FIG. 4B, luminous intensity curve 54 shows an additional increase in luminous intensity for the embodiment of FIG. 5A, with gain of about 2.38 vs. the gain of about 1.50 in FIG. 4B. Moreover, by comparison with curve 50 of FIG. 4B luminous intensity curve 54 of FIG. 5B exhibits a measurably reduced crosstalk effect around 8.5 degrees and shifts the peak angle closer to the normal direction (approximately centered about 0.5°).

In the embodiments shown in FIGS. 4A and 5A, pitch dimensions P and Q are essentially equal, which obtains high luminous intensity at peak angle (in FIG. 4B, peak angle being around −8.5 degrees). In some cases, it may be possible to enhance 0-degree luminous intensity with pitch value Q as an integer multiple of pitch value P. That is, there may be enhanced 0 degree luminous intensity when there is an integer multiple relation between P and Q, that is, where Q=nP, n being an integer (whole number). Here, integer n is at most 5. When n is 2 or greater, each prismatic structure 24 cooperates with two or more lenticular structures 26. Preferably, integer n is no more than 3; the most preferable arrangement is with n=1, so that P=Q, as is shown in FIGS. 4A and 5A and each prismatic structure 24 is paired with a corresponding lenticular element 26.

Figure 11B:
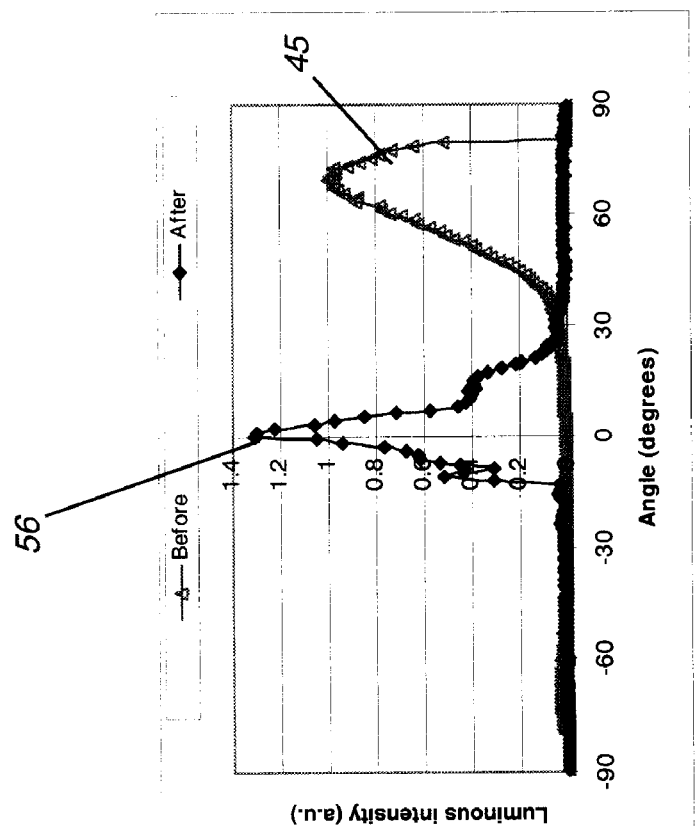
FIG. 11B is a graph showing luminous intensity response for the embodiment of FIG. 11A.
Figure 11A:
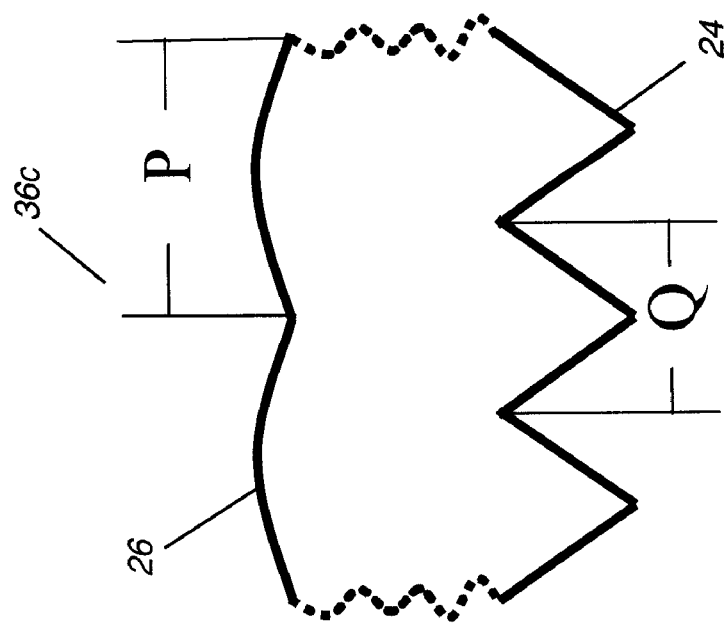
FIG. 11A is a side view showing a turning film in one embodiment of the present invention.

It must be observed that, in some cases, an integer multiple relation between P and Q where n is 2 or greater, may not increase luminous intensity with respect to normal (that is, 0-degree luminous intensity). As a general rule, where pitch Q is not equal to or some integer number multiple of pitch P, there is splitting and refraction of at least some portion of rays in an oblique direction, rather than toward normal. For example, referring to FIG. 11A, there is shown a turning film 36c having an arrangement in which P and Q pitch values are not equal. The graph of FIG. 11B shows a luminous intensity curve 56 resulting from this P and Q pitch inequality with a gain of about 1.30 and peak angle of about 0.5°.

There may be some exceptions to this general rule, where crosstalk is minimized when pitch Q is other than an integer multiple of pitch P; however, in practice, the basic integer multiple relation Q=nP provides a prerequisite for providing improved redirection and collimation, increasing on-axis, 0-degree illumination with turning film 36c of the present invention.

The shape of lenticular element 26 can be symmetric or asymmetric depending on various factors such as prismatic structure 24 peak angles, dimensions of structural components, substrate type, and the angular luminous intensity profile of the incoming light from light guiding plate 10. In symmetric cases, the lens shape for lenticular element 26 can be either spherical or aspheric.

Lenticular elements 26 can also contain diffusive elements. The diffuser elements can comprise a rough coating, smaller micro-lenses integral to the lenticular elements or scattering addenda contained within the structure of the lenticular elements to increase output angle, soften cut-off point and hide cosmetic defects.

Figures 9, 10:
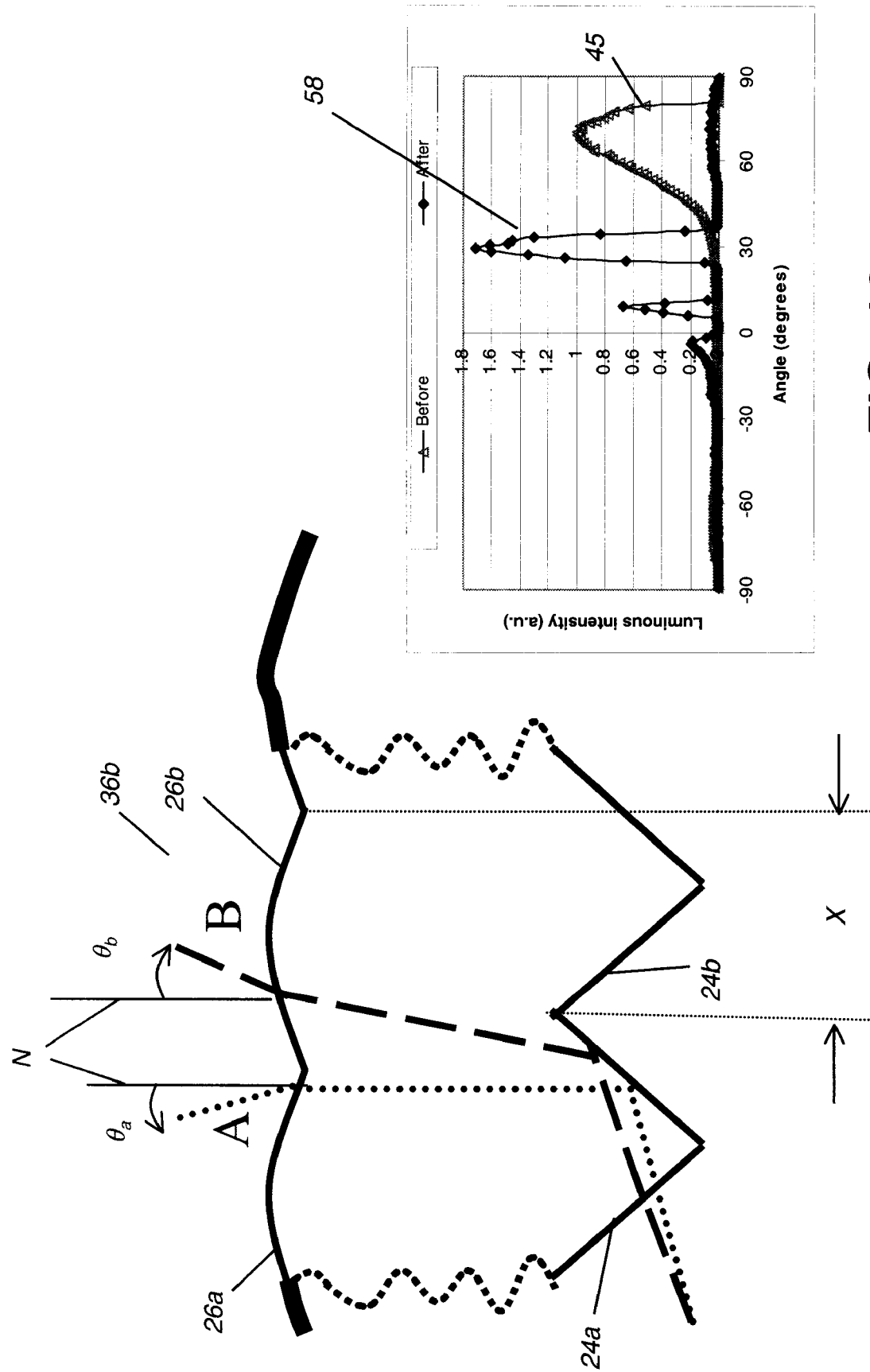
FIG. 9 is a side view showing paths of light with lens structures shifted in an alternate embodiment.
FIG. 10 is a graph of luminous intensity response for the embodiment of FIG. 9.

Shifting of lenticular elements 26 by offset dimension X, as was described with reference to FIG. 5A, can be advantageous when applied in the proper direction relative to incident light angle. Some amount of experimentation could be needed to identify the optimal offset dimension X in any particular application, depending on factors such as other dimensions of turning film 36a structures and angle of incident light, for example. As shown in FIG. 9, a turning film 36b with arbitrary use of an offset dimension X can disadvantageously increase optical crosstalk and thus degrade on-axis uniformity. FIG. 10 shows a luminous intensity curve 58 for such a disadvantageous use of offset dimension X as that shown in FIG. 9.

Figure 12:
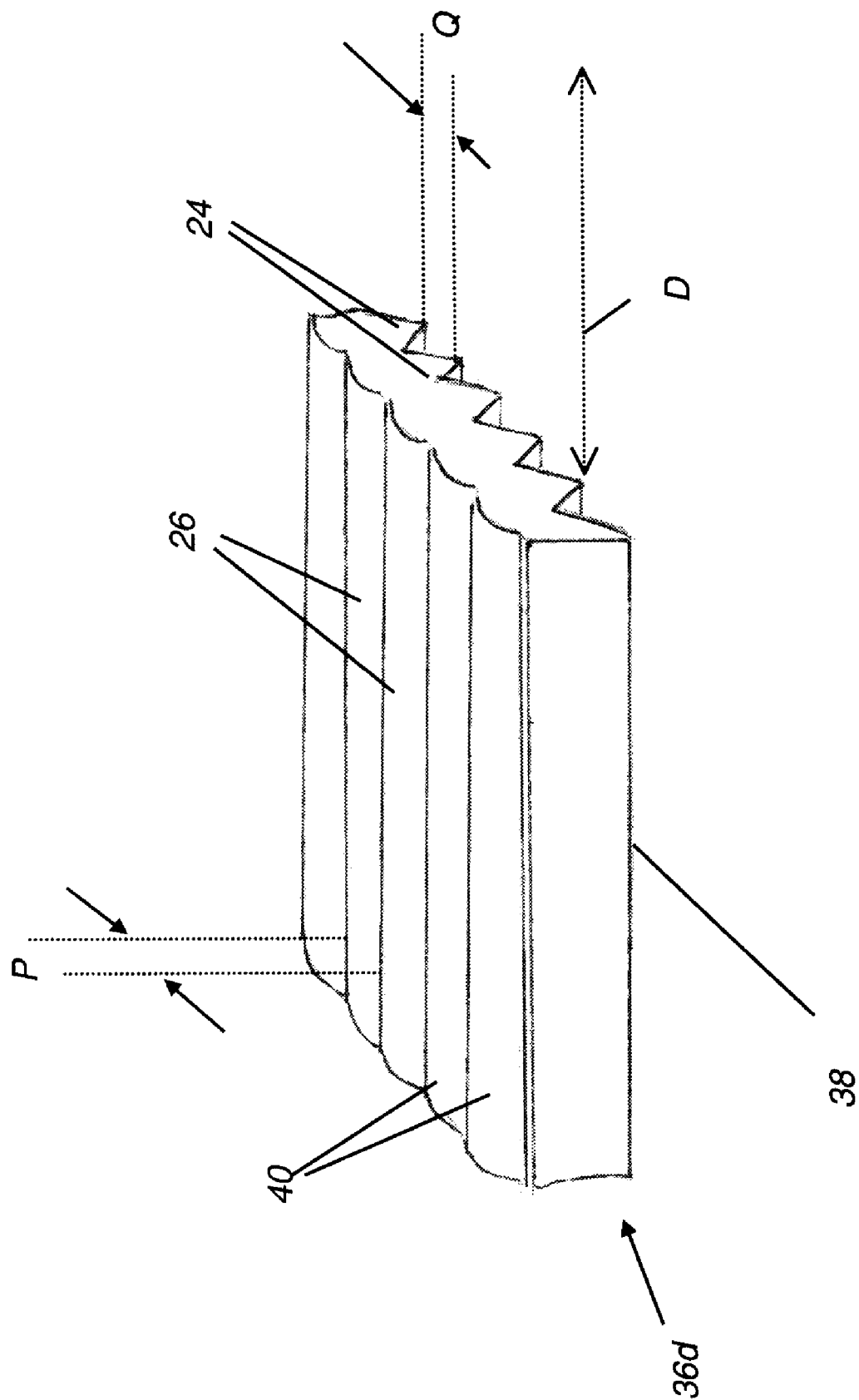
FIG. 12 is a perspective view of a portion of a turning film according to the present invention.

FIG. 12 shows a perspective view of a portion of turning film 36d. (FIG. 12 is not intended to be drawn to scale, but is intended to show key features.) On an incident light surface 38, rows of linearly elongated prismatic structures 24 extend in direction D along the sheet of turning film 36d. On a collimating output surface 40, rows of linearly elongated lenticular elements 26 also extend in the same direction D.

In the embodiment shown in FIG. 12, both linearly elongated prismatic structures 24 and lenticular elements 26 are arranged in rows, along straight lines. This arrangement allows ease of fabrication; however, these rows on either or both surfaces could alternately follow a more serpentine or winding path, which may help to reduce moiré effects, for example. The respective rows of prismatic structures 24 and lenticular elements 26 are substantially in parallel, even where a serpentine path is followed. Thus, pitch P and Q would be maintained at the same value if a serpentine path were used.

It is instructive to note that the structure of turning film 36d differs in significant ways from other types of optical films used for conditioning illumination, such as Brightness Enhancement Films (BEF), available from 3M (St. Paul, Minn.). Light conditioning structures on top and bottom layers of a BEF have different size, orientation, and functions from those shown in FIG. 12. In most BEF embodiments, prismatic structures on the same or on adjacent films are oriented orthogonally with respect to one another, for conditioning the light path with respect to both x and y directions. Where a particular BEF embodiment may use lenticular elements, these refractive components are used to reflect some portion of light and transmit some portion of light. The reflected portion of light is then recycled through these refractive components. These components are generally used with a diffusing backlight, rather than for improving collimation without involving light recycling, as with the present invention. Similarly, turning film solutions such as those disclosed in the '462 Suzuki et al. patent cited above employ a lenticular output surface arrangement for light diffusion, not for collimation. Yet another significant difference that distinguishes the film of FIG. 12 from conventional BEF and turning film embodiments relates to the relative size of structures on incident light surface 38 and collimating output surface 40, as described subsequently. Films with microstructures on both sides as disclosed in U.S. Patent Application Publication Nos. 2006/0210770 to Nelson et al. and 2006/0209428 to Dobbs et al., WO2005/025837 to Huizinga et al., and WO2005/025845 to King et al. are used to reduce defect or moiré. Films with microstructures on both sides as disclosed in U.S. Patent Application Publication No 2005/0276071 to Sasagawa et al. are used to form images at two distinct directions rather than provide high luminous intensity at one direction.

Summary Of Modeling Results

Modeling that has been carried out for various turning film designs that employ prisms on the surface facing the light guiding plate and lenticular elements on the output surface shows considerable promise for enhanced turning film design. Improvements that have been obtained include not only increased intensity, but also relatively well-directed light when compared against conventional solutions. Subsequent description gives result data that is obtained when adjusting various dimensional parameters for turning film features.

Examples that follow show how the values of the angles, pitches, curvature, extent out of registration, and thickness can be selected using the present invention to provide a peak output angle of ±15° of normal and an optical gain of at least 1.25. For simplicity, the thickness d of the core layer 25 is used in the modeling, which is related to the total film thickness T, peak half angles α, β, the pitches P, Q, and the radius R of the lenticular element as follows, assuming that the lenticular elements are closely packed:

$$T = d + Q\frac{\cos(\alpha)\cos(\beta)}{\sin(\alpha + \beta)} + \left(R - \sqrt{R^2 - \frac{P^2}{4}}\right).$$

Optical Gain and Peak Angle of a Turning Film

In general, light distribution is specified in terms of spatial and angular distributions. The spatial distribution of light can be made quite uniform, achieved by careful placement of micro features on top and/or bottom sides of a light guide plate. The angular distribution of light is specified in terms of luminous intensity I as a function of polar angle θ and azimuthal angle. The angular distribution of light is measured with EZ Contrast 160 (available from Eldim, France). Polar angle θ is the angle between the light direction and the normal of the light guide plate N, which is the same as the angle shown in FIGS. 2A and 3A. The azimuthal angle is the angle between the projection of the light onto a plane that is perpendicular to the normal direction N and a direction that is parallel to the length direction of the light guide plate. As shown in FIG. 1, the length direction of the light guide plate is perpendicular to the light source 12 and the normal direction N. The angular distribution of light can also be specified in terms of luminance L as a function of polar angle θ and azimuthal angle. The luminance L and the luminous intensity I are related by L=I/cos(θ). When the polar angle θ is close to 90 degrees, the luminance L becomes dramatically different from the luminance at 0 degree, making L generally unsuitable for the description of light emitted from a light guide plate at a large polar angle.

For simplicity, luminous intensity curves shown in FIGS. 2B, 3B, 4B, 5B, 10, and 11B show luminous intensity as a function of polar angle θ, with the azimuthal angle at 0 degree and 180 degrees. Positive polar angle θ corresponds to azimuthal angle at 0 degree, and negative polar angle θ corresponds to azimuthal angle at 180 degrees. The peak intensity of a light distribution is defined as the maximum luminous intensity. The peak angle of a light distribution is defined as the polar angle at which the peak luminous intensity occurs. In FIGS. 2B, 3B, 4B, 5B, 10, and 11B, the peak angle of the luminous intensity curve 45, which corresponds to the output luminous intensity distribution of the light guide plate used in combination with a turning film, is around 70 degrees, and its peak luminous intensity is normalized as 1. The luminous intensity curves 46, 48, 50, 54, 56, and 58 correspond to the output luminous intensity distribution of the light that is transmitted through various turning film embodiments. Each luminous intensity curve then defines a peak luminous intensity and a peak angle.

The optical gain of a turning film is defined as a ratio of the peak luminous intensity of the light that is transmitted through the turning film over the peak luminous intensity of the light that is emitted from a light guide plate. As a result, the optical gain of a turning film is not dependent upon the absolute level of the light source, but mostly dependent upon the turning film design itself.

It has been found that various turning film designs can be compared in terms of two critical quantities: optical gain (or simply termed gain) and peak angle of the light that is transmitted through the turning film.

Impact of Angles α and β

According to one embodiment of the present invention, the turning film has microstructures on both sides, as shown in FIG. 5A, and has predetermined refractive index n=1.50, d=120 μm, R=75 μm, X/P=0.2, and P=Q=49.995 μm as summarized in Table 1A. Its angles α and β both are selected to be between 29° and 37°, or the sum of (α+β) is selected in the range of 58 to 74°, as shown in Table 1B. Examples 1.2 through 1.10 according to the present invention, shown at the header of each column in Table 1B, all provide a gain of at least 1.42 and exhibit a peak angle within ±6°. In comparative Example 1.1, α and β are both equal to 38°, just outside of the selected range between 29° to 37°. In this case, the turning film has a lower gain of 1.17. Additionally, the peak angle when using these parameters is 27.5°, well outside of the preferred range of ±10°. In comparative Example 1.11, α and β both are equal to 28°, again outside the selected range of 29° to 37°. Here, although the turning film has a relative high gain of 1.83, the peak angle is −21.5°, again well outside the preferred range of ±10°.

TABLE 1A

| Profile | Angle α | Angle β | Refractive Index n | Thickness d (μm) | Radius of curvature R (μm) | Out-of registration Ratio X/P |
|---|---|---|---|---|---|---|
| Double | Varies | Varies | 1.50 | 120 | 75 | 0.2 |

TABLE 1B

Results

| EX | TYPE | α = β | GAIN | PEAK ANGLE |
|---|---|---|---|---|
| 1.1 | Comp | 38° | 1.17 | 27.5° |
| 1.2 | Inv | 37° | 1.42 | 4.5° |
| 1.3 | Inv | 36° | 1.75 | 3.5° |
| 1.4 | Inv | 35° | 2.01 | 2.5° |
| 1.5 | Inv | 34° | 2.23 | 2.5° |
| 1.6 | Inv | 33° | 2.39 | 0.5° |
| 1.7 | Inv | 32° | 2.44 | −2.5° |
| 1.8 | Inv | 31° | 2.16 | −2.5° |
| 1.9 | Inv | 30° | 1.80 | −3.5° |
| 1.10 | Inv | 29° | 1.51 | −5.5° |
| 1.11 | Comp | 28° | 1.83 | −21.5° |

Impact of Angle α

According to another embodiment of the present invention, the turning film has microstructures on both sides, as shown in FIG. 5A, and has predetermined n=1.50, d=120 μm, R=75 μm, X/P=0.2, P=Q=49.995 μm, and β=33°, as summarized in Table 2A. Its angle α is selected to be between 38° and 28°, as shown using the data of Table 2B. Examples 2.3 through 2.10 according to the present invention all provide a gain of at least 1.49 and exhibit a peak angle within ±6.5°. In all the comparative Examples 2.1, 2.2, and 2.11, α is outside of the selected range of 38° and 28°. In comparative Example 2.1, the turning film has the peak angle of 28.5°, well outside of the preferred range of ±10°. In comparative Example 2.11, the turning film has the peak angle of −23.5°, again well outside of the preferred range of ±10°. In comparative Example 2.2, the turning film has the peak angle of 7.5°, within the preferred range of ±10°, however, its gain is 1.23, lower than the preferred gain of greater than 1.25.

TABLE 2A

| Profile | Angle α | Angle β | Refractive Index n | Thickness d (μm) | Radius of curvature R (μm) | Out-of registration Ratio X/P |
|---|---|---|---|---|---|---|
| Double | Varies | 33° | 1.50 | 120 | 75 | 0.2 |

TABLE 2B

Results

| EX | TYPE | α | GAIN | PEAK ANGLE |
|---|---|---|---|---|
| 2.1 | Comp | 40° | 1.41 | 28.5° |
| 2.2 | Comp | 39° | 1.23 | 7.5° |
| 2.3 | Inv | 38° | 1.49 | 6.5° |
| 2.4 | Inv | 37° | 1.74 | 5.5° |
| 2.5 | Inv | 36° | 1.91 | 4.5° |
| 2.6 | Inv | 35° | 2.19 | 3.5° |
| 2.7 | Inv | 33° | 2.39 | 0.5° |
| 2.8 | Inv | 32° | 2.38 | −2.5° |
| 2.9 | Inv | 30° | 1.94 | −4.5° |
| 2.10 | Inv | 28° | 1.49 | −6.5° |
| 2.11 | Comp | 27° | 1.61 | −23.5° |

Impact of Radius of Curvature R of the Lenticular Lens

According to another embodiment of the present invention, the turning film has microstructures on both sides, as shown in FIG. 5A, and has predetermined n=1.50, d=120 μm, X/P=0.2, P=Q=49.995 μm, and α=β=33°, as summarized in Table 3A. Its radius R is selected to be between 45 μm and 250 μm, or between 0.9P and 5P, as shown in Table 3B. Examples 3.3 through 3.9 according to the present invention all have the gain of at least 1.29 and peak angle within ±2.5°. In all the comparative Examples 3.1, 3.2, 3.10, 3.11, 3.12, and 3.13, R is outside of the selected range of 45 μm and 250 μm, and the gain is lower than 1.25.

TABLE 3A

| Profile | Angle α | Angle β | Refractive Index n | Thickness d (μm) | Radius of curvature R (μm) | Out-of registration Ratio X/P |
|---|---|---|---|---|---|---|
| Double | 33° | 33° | 1.50 | 120 | varies | 0.2 |

TABLE 3B

Results

| EX | TYPE | R | GAIN | PEAK ANGLE |
|---|---|---|---|---|
| 3.1 | Comp | 30 | 0.69 | −0.5° |
| 3.2 | Comp | 40 | 1.19 | 2.5° |
| 3.3 | Inv | 45 | 1.52 | 2.5° |
| 3.4 | Inv | 50 | 1.85 | 2.5° |
| 3.5 | Inv | 75 | 2.39 | 0.5° |

TABLE 3B-continued

| EX | TYPE | R | GAIN | PEAK ANGLE |
|---|---|---|---|---|
| 3.6 | Inv | 100 | 2.52 | −0.5° |
| 3.7 | Inv | 150 | 1.62 | 0.5° |
| 3.8 | Inv | 200 | 1.37 | 1.5° |
| 3.9 | Inv | 250 | 1.29 | 1.5° |
| 3.10 | Comp | 300 | 1.23 | −0.5° |
| 3.11 | Comp | 500 | 1.10 | 1.5° |
| 3.12 | Comp | 700 | 1.08 | −4.5° |
| 3.13 | Comp | 900 | 1.06 | 0.5° |

Impact of Total Film Thickness T or Core Thickness d

According to another embodiment of the present invention, the turning film has microstructures on both sides, as shown in FIG. 5A, and has predetermined n=1.50, R=75 µm, X/P=0.2, P=Q=49.995 µm, and α=β=33°, as summarized in Table 4A. Its core thickness d is selected to be between 1 µm and 275 µm, or approximately between 0 and 5.5P, as shown in Table 4B. Examples 4.1 through 4.5 according to the present invention all provide a gain of at least 1.40 and peak angle within ±1.5°. In all the comparative Examples 4.6, 4.7, 4.8, and 4.9, d is outside of the selected range of 1 µm and 275 µm, and the gain is lower than 1.25.

Note that the total film thickness T is related to the core thickness d, peak half angles α, β, the pitches P, Q, and the radius R of the lenticular element. Assume the lenticular elements are closely packed, one obtains that $$T = d + Q\frac{\cos(\alpha)\cos(\beta)}{\sin(\alpha+\beta)} + \left(R - \sqrt{R^2 - \frac{P^2}{4}}\right).$$

When $P = Q$, and $\alpha = \beta = \frac{\alpha+\beta}{2}$, then $\frac{d}{P} = \frac{T}{P} - \frac{\cos^2\left(\frac{\alpha+\beta}{2}\right)}{\sin(\alpha+\beta)} - \left(\frac{R}{P} - \sqrt{\left(\frac{R}{P}\right)^2 - \frac{1}{4}}\right)$ is preferred to be in the range of 0 and 5.5.

Assume $0.9 \leq R/P \leq 5$ and $58° \leq \alpha+\beta \leq 74°$, then $$\frac{T}{P}$$

is preferred to be in the range of 0.7 to 6.6.

TABLE 4A

| Profile | Angle α | Angle β | Refractive Index n | Thickness d (µm) | Radius of curvature R (µm) | Out-of registration Ratio X/P |
|---|---|---|---|---|---|---|
| Double | 33° | 33° | 1.50 | varies | 75 | 0.2 |

TABLE 4B

| EX | TYPE | d (µm) | GAIN | PEAK ANGLE |
|---|---|---|---|---|
| 4.1 | Inv | 1 | 1.40 | 0.5° |
| 4.2 | Inv | 25 | 1.63 | −0.5° |
| 4.3 | Inv | 120 | 2.39 | 0.5° |
| 4.4 | Inv | 225 | 2.25 | 1.5° |
| 4.5 | Inv | 275 | 1.54 | 1.5° |
| 4.6 | Comp | 325 | 1.12 | 1.5° |
| 4.7 | Comp | 375 | 1.00 | 0.5° |
| 4.8 | Comp | 425 | 0.89 | 4.5° |
| 4.9 | Comp | 625 | 0.87 | 0.5° |

Impact of Refractive Index n

According to another embodiment of the present invention, the turning film has microstructures on both sides, as shown in FIG. 5A, and has predetermined d=120 µm, R=75 µm, X/P=0.2, P=Q=49.995 µm, and α=β=33°, as summarized in Table 5A. Its index n is selected to be between 1.2 and 1.9, as shown in Table 5B. Examples 5.1 through 5.9 according to the present invention all provide gain of at least 1.42 and peak angle within ±3.5°. In all the comparative Examples 5.10, and 5.11, index n is outside of the selected range of 1.2 and 1.9, and the gain is lower than 1.25.

TABLE 5A

| Profile | Angle α | Angle β | Refractive Index N | Thickness d (µm) | Radius of curvature R (µm) | Out-of registration Ratio X/P |
|---|---|---|---|---|---|---|
| Double | 33° | 33° | Varies | 120 | 75 | 0.2 |

TABLE 5B

| EX | TYPE | N | GAIN | PEAK ANGLE |
|---|---|---|---|---|
| 5.0 | Comp | 1.15 | 0.85 | 3.5° |
| 5.1 | Inv | 1.20 | 1.50 | 1.5° |
| 5.2 | Inv | 1.30 | 2.29 | −0.5° |
| 5.3 | Inv | 1.34 | 2.63 | −0.5° |
| 5.4 | Inv | 1.40 | 2.66 | −1.5° |
| 5.5 | Inv | 1.50 | 2.39 | 0.5° |
| 5.6 | Inv | 1.60 | 2.13 | 2.5° |
| 5.7 | Inv | 1.70 | 1.84 | 3.5° |
| 5.8 | Inv | 1.80 | 1.59 | 3.5° |
| 5.9 | Inv | 1.90 | 1.42 | 3.5° |
| 5.10 | Comp | 2.0 | 1.22 | 2.5° |
| 5.11 | Comp | 2.1 | 1.13 | 3.5° |

TABLE 6A

Impact of Ratio X/P and Value (1 − X/P)

| Profile | Angle α | Angle β | Refractive Index n | Thickness d (µm) | Radius of curvature R (µm) | Out-of registration Ratio X/P |
|---|---|---|---|---|---|---|
| Double | 33° | 33° | 1.60 | 120 | 75 | varies |

TABLE 6B

| | | | | PEAK |
|---|---|---|---|---|
| EX | TYPE | X/P | GAIN | ANGLE |
| 6.1 | Inv | 1.0 | 1.9 | −1.5° |
| 6.2 | Inv | 0.9 | 1.67 | −4.5° |
| 6.3 | Inv | 0.8 | 1.49 | −6.5° |
| 6.4 | Comp | 0.7 | 1.24 | 10.5° |
| 6.5 | Inv | 0.6 | 1.61 | 8.5° |
| 6.6 | Inv | 0.5 | 1.77 | 6.5° |
| 6.7 | Inv | 0.4 | 2.05 | 4.5° |
| 6.8 | Inv | 0.3 | 2.11 | 2.5° |
| 6.9 | Inv | 0.2 | 2.11 | 2.5° |
| 6.10 | Inv | 0.1 | 1.96 | −0.5° |
| 6.11 | Inv | 0.0 | 1.9 | −1.5° |

According to another embodiment of the present invention, the turning film has microstructures on both sides, as shown in FIG. 5A, and has predetermined n=1.60, d=120 µm, R=75 µm, P=Q=49.995 µm, and α=β=33°, as summarized in Table 6A. Its ratio X/P is selected to be between 0.8 and 1.0 and between 0.0 and 0.6, as shown in Table 5B. Examples 6.1 through 6.3 and Examples 6.5 through 6.11 according to the present invention all provide gain of at least 1.49 and peak angle within ±6.5°. In the comparative Example 6.4, the gain is lower than 1.25 and the peak angle is outside of the range ±10°. In addition, X/P is most preferably in the range of 0.1 and 0.4. The gain of Examples 6.7 through 6.10 is at least 1.96, much higher than the gain of other examples.

Figure 15B:
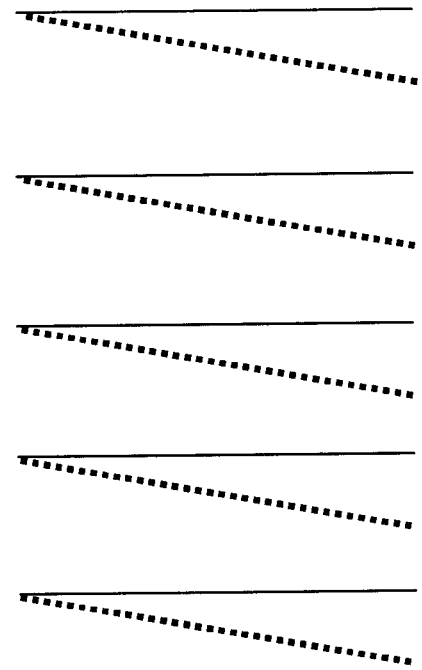
FIGS. 15A, 15B are side views of a portion of a double sided turning film showing various offset dimensions.
Figure 15B:
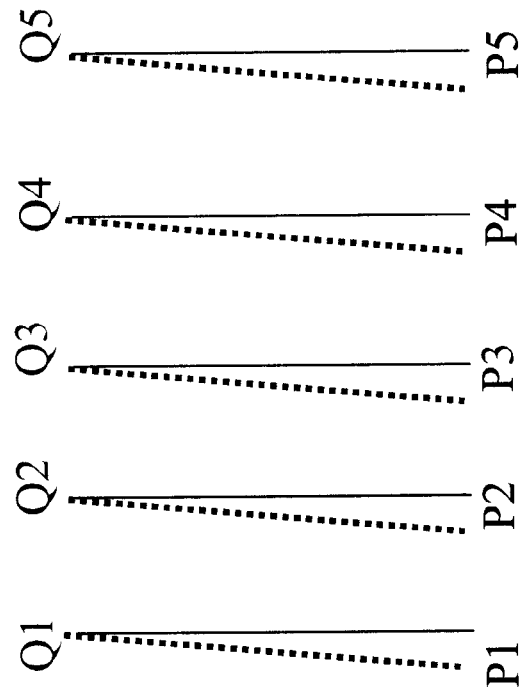
Figure 15A:
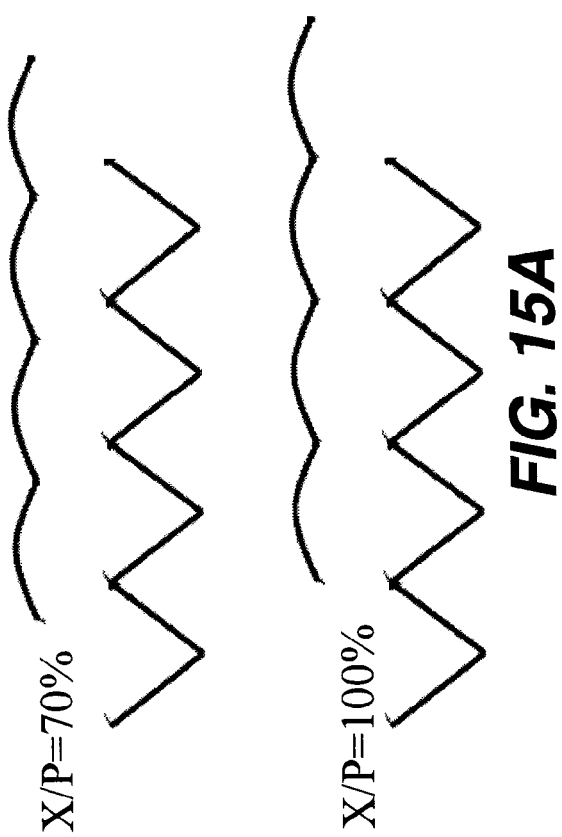
Figure 15A:
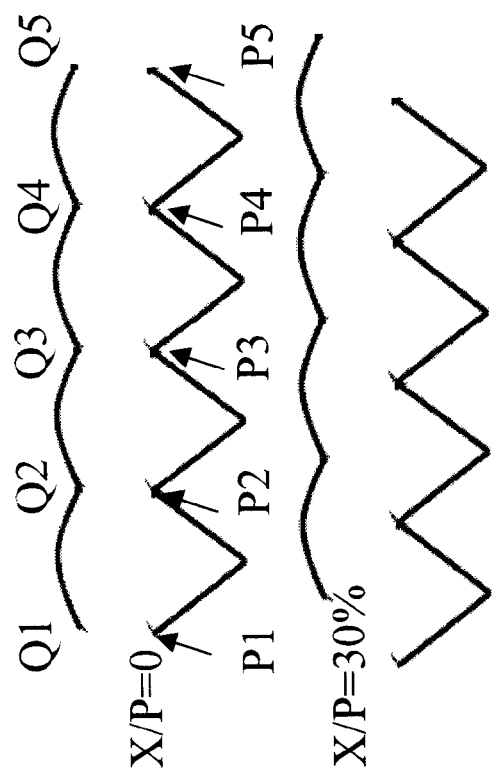

FIGS. 15A, 15B are side views of a portion of a double sided turning film showing various offset dimensions. Values X/P and (1−X/P) yield similar results. A film fabricated to provide ratio X/P can be rotated horizontally 180 degrees to provide the behavior of a film fabricated to provide ratio (1−X/P).

Examples 7.1 through 7.11 are the same as Examples 6.1 through 6.11 except that index n=1.52 instead of 1.60, as shown in Table 7A. In this case, any ratio X/P between 0.0 and 1.0 leads to a gain of at least 1.44, and a peak angle within ±8.5°. However, again, ratio X/P is most preferably in the range of 0.1 and 0.4, as shown in Table 7B. The gains of Examples 6.7 through 6.10 are greater than the gains of other examples.

TABLE 7A

| Profile | Angle α | Angle β | Refractive Index n | Thickness d (µm) | Radius of curvature R (µm) | Out-of registration Ratio X/P |
|---|---|---|---|---|---|---|
| Double | 33° | 33° | 1.52 | 120 | 75 | varies |

TABLE 7B

Results

| EX | TYPE | X/P | GAIN | PEAK ANGLE |
|---|---|---|---|---|
| 7.1 | Inv | 1.0 | 2.14 | −2.5° |
| 7.2 | Inv | 0.9 | 1.93 | −4.5° |
| 7.3 | Inv | 0.8 | 1.63 | −6.5° |
| 7.4 | Inv | 0.7 | 1.44 | −8.5° |
| 7.5 | Inv | 0.6 | 1.53 | 6.5° |
| 7.6 | Inv | 0.5 | 1.84 | 4.5° |
| 7.7 | Inv | 0.4 | 2.17 | 3.5° |

TABLE 7B-continued

Results

| EX | TYPE | X/P | GAIN | PEAK ANGLE |
|---|---|---|---|---|
| 7.8 | Inv | 0.3 | 2.37 | 1.5° |
| 7.9 | Inv | 0.2 | 2.35 | 1.5° |
| 7.10 | Inv | 0.1 | 2.23 | −1.5° |
| 7.11 | Inv | 0.0 | 2.14 | −2.5° |

TABLE 8A

Impact of Apex Radius

| Profile | Angle α | Angle β | Refractive Index n | Thickness d (µm) | Apex Radius r (µm) | Out-of registration Ratio X/P | Apex Radius (µm) |
|---|---|---|---|---|---|---|---|
| Double | 33° | 33° | 1.52 | 120 | 75 | 0.2 | varies |

TABLE 8B

Results

| EX | TYPE | Apex Radius (µm) | GAIN | PEAK ANGLE |
|---|---|---|---|---|
| 8.1 | Inv | 0 | 2.39 | 0.5° |
| 8.2 | Inv | 1 | 2.40 | 0.5° |
| 8.3 | Inv | 3 | 2.39 | −0.5° |
| 8.4 | Inv | 5 | 2.23 | −1.5° |
| 8.5 | Inv | 9 | 1.85 | −3.5° |
| 8.6 | Inv | 11 | 1.59 | −4.5° |
| 8.7 | Inv | 12 | 1.45 | −5.5° |
| 8.8 | Inv | 13 | 1.32 | −5.5° |
| 8.9 | Comp | 14 | 1.09 | −5.5° |
| 8.10 | Comp | 15 | 0.97 | −6.5° |

Figure 13:
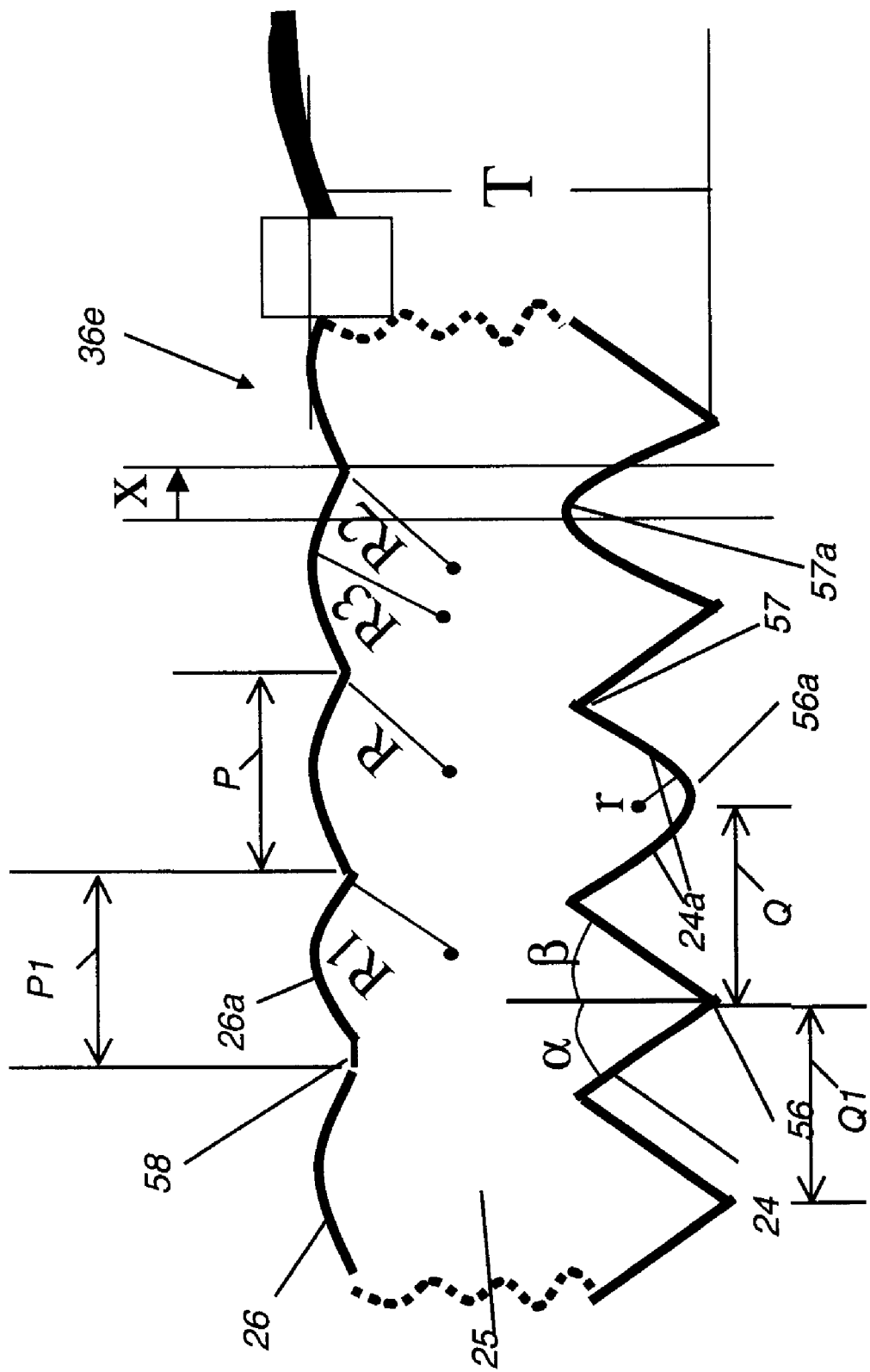
FIG. 13 is a side view showing a double sided turning film with varying features of the present invention.

According to another embodiment of the present invention, the turning film has microstructures on both sides, as shown in FIG. 5A, and has predetermined n=1.50, d=120 µm, R=75 µm, P=Q=49.995 µm, X/P=0.8, and α=β=33°, as summarized in Table 8A. Its apex radius r is selected to be between 0.0 and 13.0 µm, or 0.0 to 0.26P, as shown in Table 8B. Examples 8.1 through 8.8 according to the present invention all provide gain of at least 1.32 and peak angle within ±5.5°. In comparative Examples 8.9 and 8.10, the gain is lower than 1.25. Note the apex radius r as illustrated in FIG. 13 referring to apex 56a. When r is 0, the apex is sharp.

Variation of Turning Film Features

In addition to identifying combinations of dimensional parameters that help to optimize turning film performance for a given application, the method of the present invention also provides some variability in surface features of the turning film. FIG. 13 shows variations of a double sided turning film 36e according to the present invention. Compared to turning film 36a shown in FIG. 5A, turning film 36e has one or more additional and altered features discussed in the followings.

One feature change that can be suitable relates to the apex angle of prismatic structures 24 on the surface that faces the light guiding plate. In embodiments described earlier, a relatively sharp apex angle has been shown. However, more generally, apex 56 may have a range of characteristic shapes, as shown in the example of FIG. 13. Apex 56 may be sharp or may be rounded or curved as shown as an apex 56a, or may be truncated or flattened (not shown).

In general, a sharp apex has been found most beneficial for maximizing light efficiency, but may be difficult to fabricate. During assembly, a sharp apex surface may even risk scratch damage to the light guiding plate beneath. A rounded apex 56a, on the other hand, offers a number of practical advantages. Rounding reduces potential scratching problem and is easier to fabricate. The radius of the rounded apex can vary in a range from 0.0 to about 13.0 microns, or from 0 to about 0.26P. As a result, the height of the prismatic structure 24a may vary. Within this range, the light luminous intensity output decreases somewhat when compared to more optimized designs with sharp apex angles, however, luminous intensity is still much higher that for conventional turning film designs not using lenticular elements.

Another variation in turning film design relates to grooves 57 and 57a that are defined between prismatic structures 24 or 24a. FIG. 13 shows groove 57 coming to a sharp point and alternate groove 57a that is more rounded, with radius varying in a range of 0 to about 13 microns, or from 0 to about 0.26P. Grooves between lenticular elements 26 could be similarly varied to be sharp or more rounded. A rounded or flattened surface 58 may also be formed between lenticular curved surfaces.

A mix of variable prismatic structures, apex shapes, and groove shapes is possible, including a mix of different structures and shapes within the same turning film 36e. The prismatic structures and lenticular elements 26 may also vary from others in the same film in at least one cross sectional dimension, as shown in FIG. 13. In the example shown, the prismatic structures have a varying pitch Q or Q1. Lenticular elements 26 and 26a likewise have a varying pitch P and P1 and a varying radius R and R1. Consequently the offset dimension X may also vary from one pairing of prismatic structure 24 and its associated lenticular element 26 or 26a to the next. However, for each prismatic structure-lenticular element pair (24a and 26a, 24b and 26b, for example), where the prismatic structure and the lenticular element of the pair work together to redirect and collimate light as shown in FIGS. 7, 8, and 9, the corresponding offset dimension X is preferably in a range of 0.08P to 0.65P. It is instructive to note that the exemplary ranges and values for P, Q, R, X discussed earlier with reference to modeling results should be understood as their respective average values.

One or both surfaces of prismatic structure 24 may have some amount of curvature. Although a main function of the redirecting input surface of turning film 36 is to redirect light, it may also incorporate some degree of collimation effect.

For the example embodiments described earlier, lenticular element 26 has been characterized by its radius of the curvature R, which has been shown to be substantially a constant. However, experimentation and modeling indicate that there may be advantages to embodiments that are aspherical, so that, for example, radii R2 and R3 in FIG. 13 vary from each other within one lenticular element 26. In one embodiment, for example, the radius of the curvature R2, R3 may vary from 45 μm to 250 μm, or from 0.9P to 5P. The lens shape for the lenticular element, in cross section, can be aspheric or substantially spherical.

Discrete Pair of Microstructures

In some embodiments, prismatic structure 24 on the incident light surface of the turning film is extended in length to span the full width or length of the turning film. The corresponding lenticular element 26 is similarly extended from one edge of the turning film to the other. While this arrangement may offer some advantages for fabrication, other configurations are possible. One alternate embodiment makes use of discrete microstructures that exhibit, in one cross-section, the same shape and relative dimensional geometry used to enhance turning film performance with extended structures and, in the orthogonal cross section through the film, differ from the extended structures of embodiments described previously.

Figure 14A:
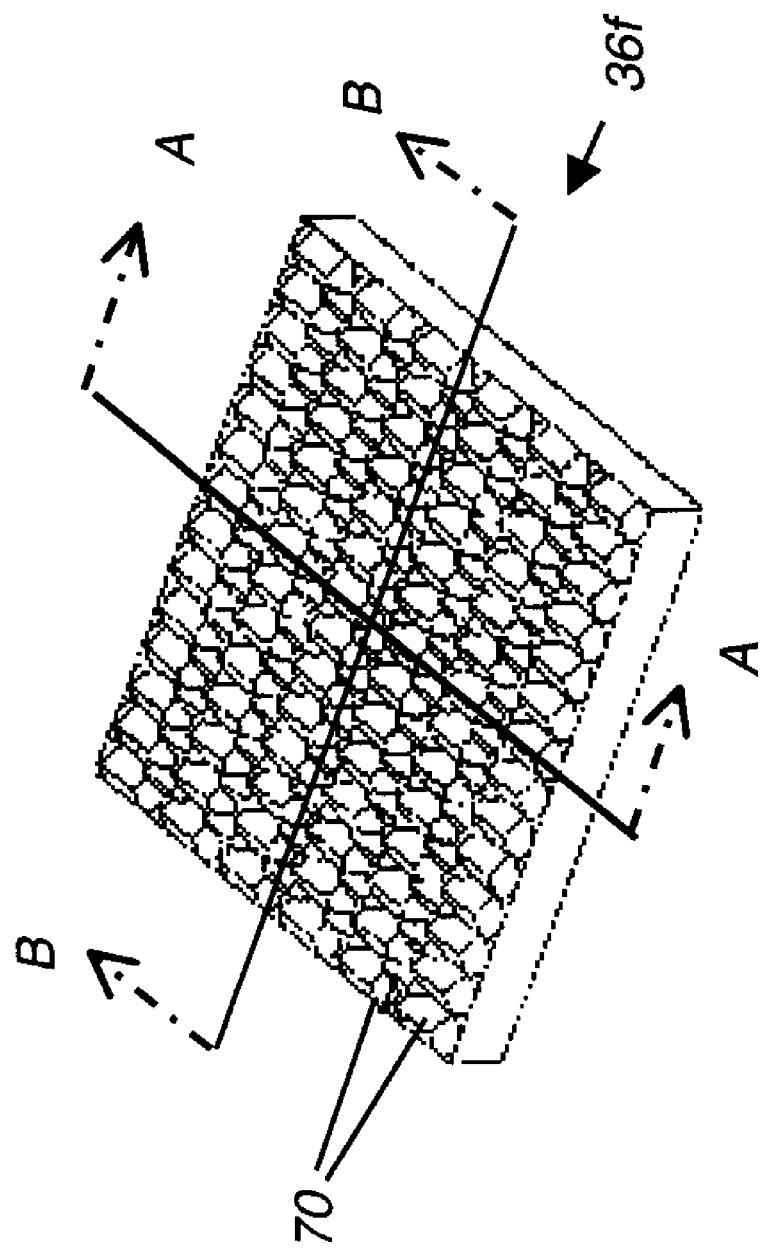
FIG. 14A shows in perspective view another embodiment of the present invention that uses discrete microstructures.

Referring to FIG. 14A, there is shown, in perspective and viewed from the incident light side that would normally face the LGP, a portion of a turning film 36f that uses paired microstructures. Prismatic structures 70 are not extended across the full dimension of turning film 36f, but are separated from each other, with intervening gaps that separate neighboring individual prismatic structures 70 from each other, considered in both lengthwise and widthwise directions.

FIGS. 14B and 14C are orthogonal cross sections of turning film 36f of FIG. 14A, taken along reference lines A-A and B-B respectively. A dashed rectangle indicates representative pairs 74 of discrete microstructures, where each pair 74 has one individual prismatic structure 70 and its corresponding lenticular element 72. As a further modification in another embodiment, discrete pair 74 as shown in FIG. 14C may also have lenticular elements 26 that are aspheric or may have individual prismatic structures 70 that are curved or themselves have a radius of curvature, as was described earlier with reference to FIG. 13.

Figure 14D:
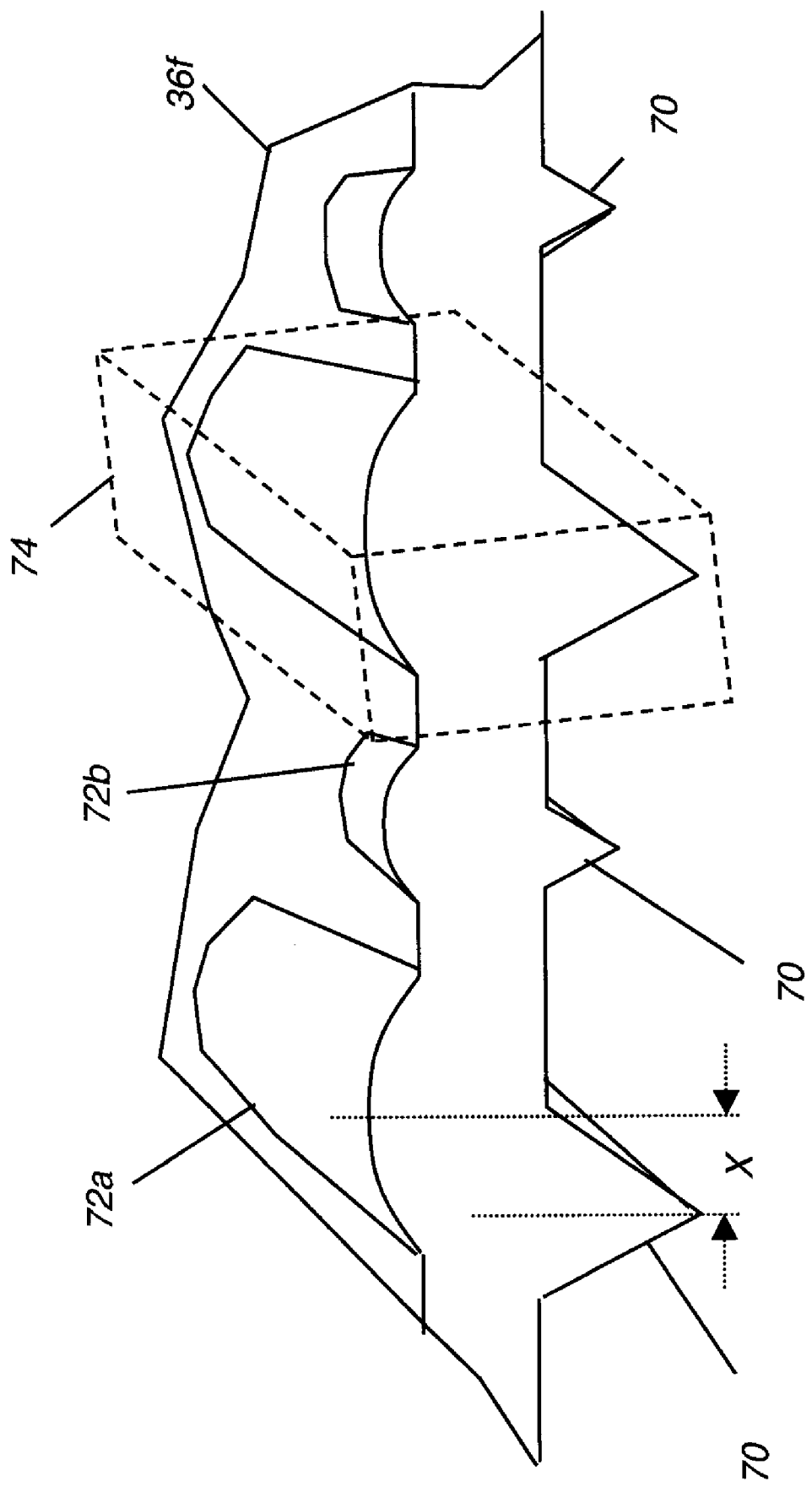
FIG. 14D is a perspective view showing a small portion of the turning film of FIG. 14A.

FIG. 14D shows a perspective view of a small portion of turning film 36f, again from angle B-B and with turning film 36f slightly inclined to show the light emission side. Pair 74 is outlined in a dashed box. As can be seen, discrete lenticular structures 72a and 72b can be considered as raised "bumps" on the surface of turning film 36f. As shown in the cross-sectional view shown in FIG. 14C and corresponding view of FIG. 14D, discrete structure pairs 74 can be distributed along the surface of turning film 36f in various ways. In the example shown, these structure pairs 74 are in adjacent rows, but are staggered somewhat with respect to each other, when considered in the longitudinal direction. Thus, for example, the view of FIG. 14D shows that the cross section slices through a middle portion of lenticular structure 72a, but slices through an end portion of adjacent lenticular structure 72b. With this arrangement, turning film 36f advantageously reduces undesirable pattern problems such as moiré patterning and other cosmetic defects, with only a small loss of light efficiency.

Additional variations are possible, such as providing a randomized arrangement of pair 74, sizing or extending the length of the discrete microstructures in a randomized fashion, or orienting discrete microstructures at a variety of angles along the surfaces of the optical turning film.

Discrete pairs 74 could be arranged in linear fashion, arranged in parallel rows that extend across the width dimension of a turning film. Alternately, discrete pairs 74 could be arranged along lines that follow more generally serpentine paths.

Display Apparatus

Figure 6:
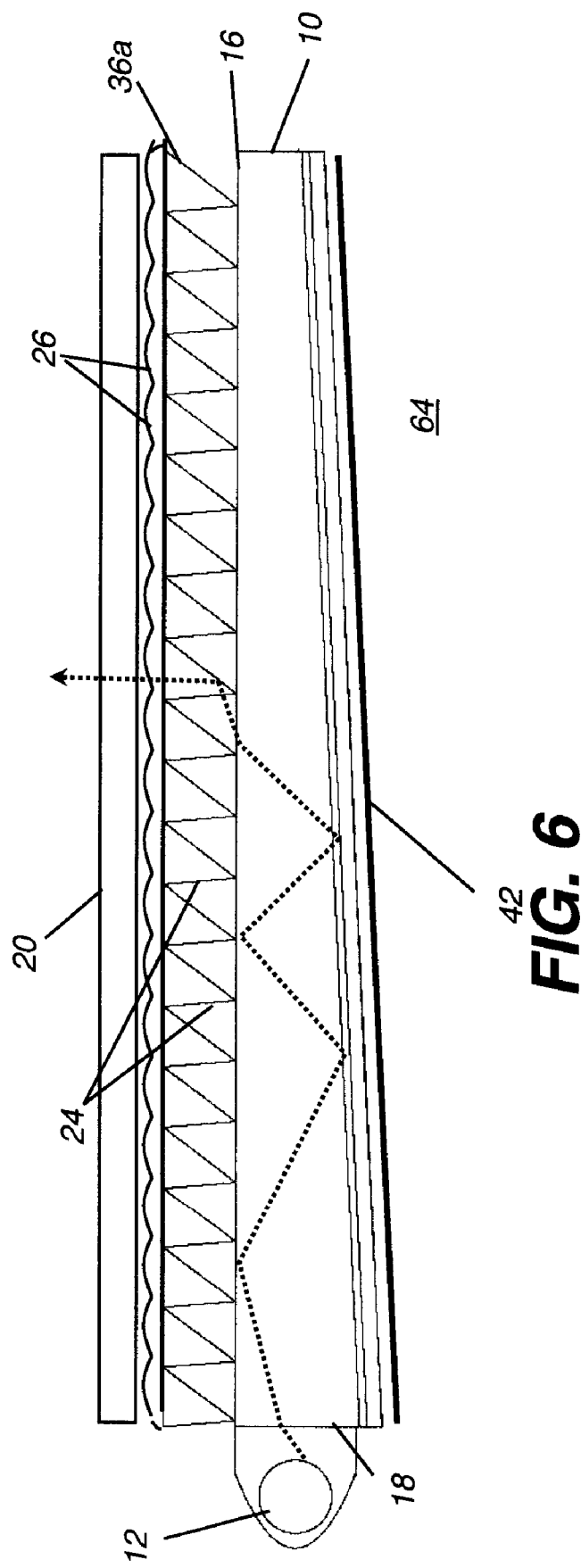
FIG. 6 is a side view of a display apparatus including a doubled sided turning film with preferred offset dimension according to the present invention.

Referring to FIG. 6, there is shown a display apparatus 64 using turning film 36a as part of the illumination subsystem, according to the present invention. Incident light from light guiding plate 10 is redirected by each prismatic structure 24 to form a redirected light, then collimated by a collimating surface using lenticular elements 26, to provide a substantially collimated illumination to light gating device 20 such as an LCD or other type of spatial light modulator.

Turning film 36a of the present invention is a redirection article that not only provides, in a single component, the functions of both collimation and redirection, but also provides improved on-axis brightness over conventional types of brightness enhancement solutions. Turning film 36a is designed for use with a light guide plate that provides light that is generally collimated with respect to one orthogonal axis and is directed at a relatively large incident angle. Turning film 36a accepts incident light at oblique angles over the range from about 40 to about 88 degrees from normal. Prismatic structures 24 provide redirected light within turning film 36a, at angles typically between +10 and −10 degrees from normal. The collimating structures of output surface 40 then provide substantially collimated output light, whose principal or central ray is preferably at, or close to, normal, or at other preferred angles such as within 20 degrees from the normal direction. The substantially collimated output illumination that is provided has a relatively narrow cone angle, typically well within about +/−10 degrees from a central or principal ray.

Note that the term "prismatic structures" as used in the context of the present disclosure broadly refers to any structure that has a substantially prismatic shape in one cross section. With reference to FIG. 13, for example, prismatic structures 24, 24a are shown. In FIG. 14C, individual prismatic structures 70 are shown.

TABLE 9

Experimental Data

| Example | | Peak Angle | Gain |
|---|---|---|---|
| Comparative 1 | Commercial product | −2° | 1.15 |
| Comparative 2 | Commercial product | 26° | 0.74 |
| Comparative 3 | 66 degrees TF, single sided | −1° | 1.05 |
| Comparative 4 | 66 degrees TF, single sided | 23° | 1.55 |
| Inventive 1 | Sample 1 | 10° | 1.92 |
| Inventive 2 | Sample 1 rotated | 4° | 1.51 |
| Inventive 3 | Sample 2 | 10° | 1.62 |
| Inventive 4 | Sample 3 | −5° | 1.48 |
| Inventive 5 | Sample 4 | 4° | 1.73 |

COMPARATIVE 1

From a commercially available turning film Diaart (Mitsubishi Rayon America, Inc., New York, N.Y.), with its prismatic structure facing downward (closer to the light guide plate). The Diaart film has prismatic structures on one side only (single sided), with some curvature on one side of each prism. Its apex angle is around 66°, its pitch is around 50 μm, its total thickness is around 260 μm.

COMPARATIVE 2

Identical to Comparative 1, except that the film is flipped over, with its prismatic structure facing upward.

COMPARATIVE 3

From a single sided turning film made of polycarbonate with apex angle of around 66°, with its prismatic structure facing downward. This turning film has straight sides on each prism.

COMPARATIVE 4

Identical to Comparative 3, except that the film is flipped over, with its prismatic structure facing upward.

INVENTIVE 1-5

From various double sided turning films made of polycarbonate (n around 1.58). The double sided turning films generally have apex angle of around 68°±5°. The radius of the curvature R=75±30 μm, P=Q=50±2 μm. The X/P varies from 0.1 to 0.5. The film thickness T varies from 200 to 240 μm. The films also have rounded apex angle with the apex radius r between 2 to 10 μm.

Process for Making Double-Sided Turning Film

As noted in the background section given above, fabrication of double-sided optical films presents particular challenges, particularly where features on opposite sides of the film must be in close register. As described earlier with reference to FIGS. 8 and 9, dimensional accuracy within the range of no more than a few microns is needed for turning film 36 designs according to the present invention. Web-based fabrication, while not a requirement for forming turning film 36, has a number of advantages, particularly with respect to cost and speed, as can be well appreciated by those skilled in the optical film fabrication arts.

The method and apparatus of the present invention take an alternative approach to conventional methods for dual-sided film fabrication, as noted in the background examples given earlier in this application. One problem that is faced by conventional solutions that use patterned drums for two-sided fabrication relates to the difficulty in achieving angular synchronization that is needed for alignment of the two patterns. For example, the optical film fabrication apparatus disclosed in the '0770 Nelson et al. application cited earlier requires precise synchronization of roller angle for each polymer layer that is added to the transparent carrier. In order to get the needed level of accuracy in obtaining the drum angle for the patterned drum, the method of the '0770 Nelson et al. disclosure utilizes two encoders for each motor: one mounted on the motor itself, the other out along the driven motor shaft. This fairly complex arrangement is needed because grooves in the optical film extend along the same direction as the axis of the patterned drum.

The method of the present invention differs in a number of respects from the conventional method that is adapted in the '0770 Nelson et al. disclosure. By rotating the direction of grooves by 90 degrees from that formed using the '0770 Nelson et al. device, the present invention eliminates the need for precision encoder systems in order to achieve microstructure alignment. Effectively, the angular synchronization of drum rotation, which is very important when using the '0770 Nelson et al. approach, is of little or no importance for the method of the present invention. Instead, correction to compensate for misaligned pairs of prismatic and lenticular components can be performed by slight translation of the drum in a direction that is parallel to its axis.

A particular challenge for fabrication of turning film 36 of the present invention relates to the profile of prismatic structures 24. The relatively sharp slopes and height requirements for these features can be difficult to obtain by conventional methods, such as embossing. However, various combinations of methods can be used for film fabrication, as described subsequently.

Figure 16:
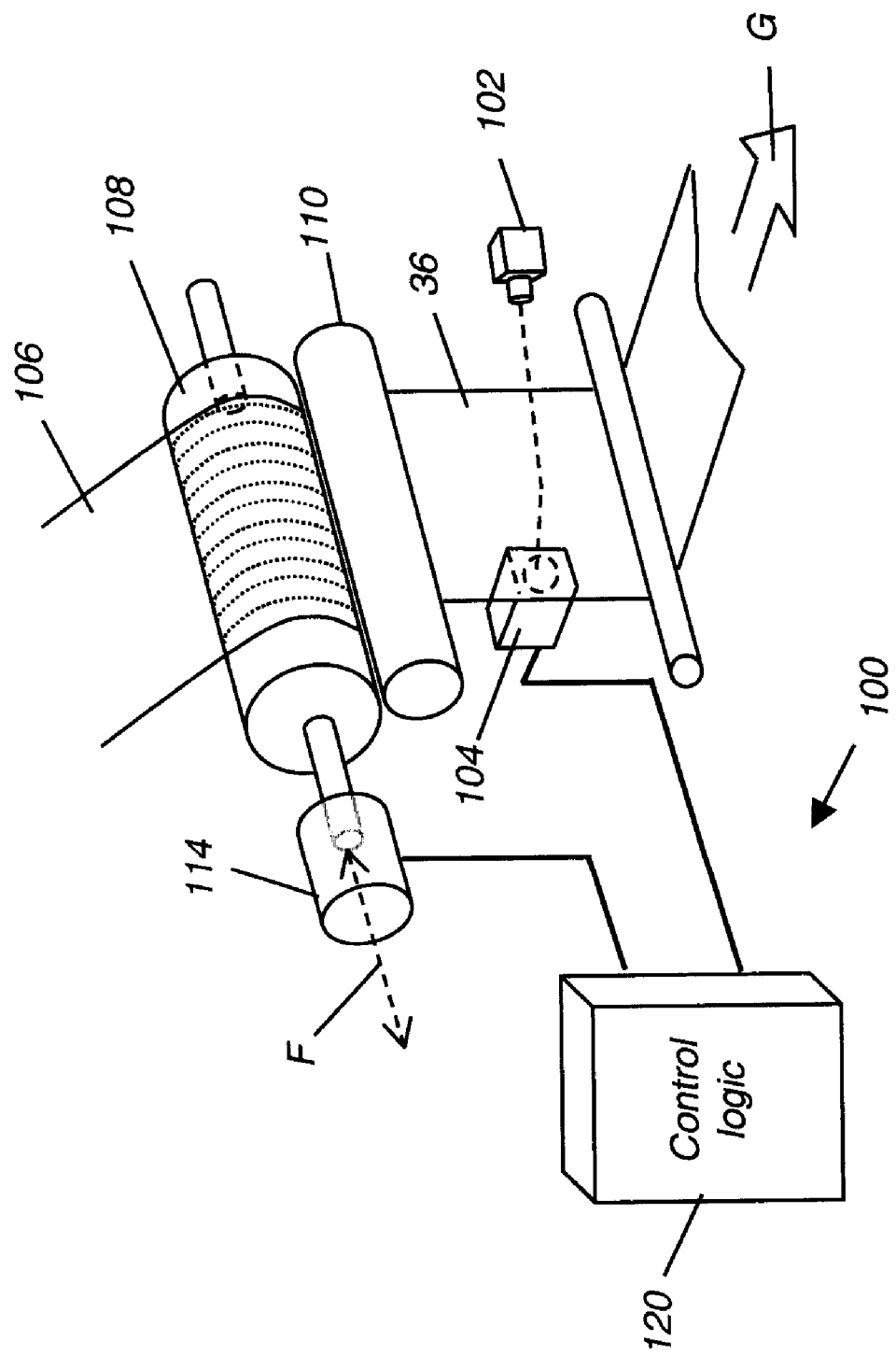
FIG. 16 illustrates a control loop used in fabrication of the turning film of the present invention.

Referring to the block diagram of FIG. 16, there is shown a control loop 100 that is used in various embodiments for turning film 36 fabrication. Subsequent description then shows various fabrication systems that may employ control loop 100 for monitoring and correcting for misregistration of prismatic and lenticular structures. A web 106, here a continuous length of a substrate that has a pattern formed on one side, is fed through the nip between a patterned roller 108 and a fixed opposing roller 110 to form a pattern on the opposite side. A double-sided turning film 36 is formed in this way and may be further coated or otherwise processed or rolled up for transport and use, following the direction given as arrow G in FIG. 16. Grooves 57 (FIG. 13) also extend in the direction of arrow G.

In control loop 100, a light source 102 directs a light through turning film 36 for detection by a light sensor 104. Light sensor 104 determines whether or not turning film 36 has correctly aligned features, based on intensity detection at various incident angles. Recalling FIG. 5B, for example, the turning film would be properly formed when incident light at sensor 104 has its peak luminous intensity value within a certain range for a given light source 102 and within few degrees from normal, given light source 102 at a suitable angle. Where the luminous intensity is not in the correct range or does not have sufficient luminous intensity at specified angles, adjustment is made by translating patterned drum, or more generally, translating web 106, in the axial direction F. A control logic processor 120, typically a dedicated microprocessor, but optionally any of a number of types of computing workstation apparatus, provides the logic and control components needed to operate control loop 100 and make small adjustments by means of axial translator 114. This results in a corresponding change in alignment for paired prism and lenticular structures on turning film 36.

Sensor 104 can be any of a number of types of light sensing device for sensing luminous intensity over an area. For example, sensor 104 can be a luminance meter BM-7 available from Topcon, Japan, or a spectroradiometer PR-650 from Photo Research, for example. Alternately, sensor 104 can sense material thickness or other properties.

Axial translator 114 can be any of a number of types of motor or actuator device. For example, axial translator 114 can be an electromechanical positioning device, BAZ-5 available from Danaher Precision Systems, or a piezoelectric high load actuator, N215, available from PI (Physik Instrumente) L.P., Karlsruhe, Germany, or a custom designed thermal-mechanical actuator consisting of metallic ring or block constrained in a manner to elongate in a direction parallel to the roller axis in response to a controlled temperature increase. An incremental liner encoder with sub-micron resolution, such as a model LF481 encoder, available from Heidenhain, Schaumburg, Ill., can be included to confirm position changes and provide feedback to the control system.

In the fabrication embodiment descriptions that follow, control loop 100 is provided to monitor light-handling behavior of turning film 36 and effect axial adjustment in order to correct for misalignment of prismatic and lenticular microstructures.

Figure 17:
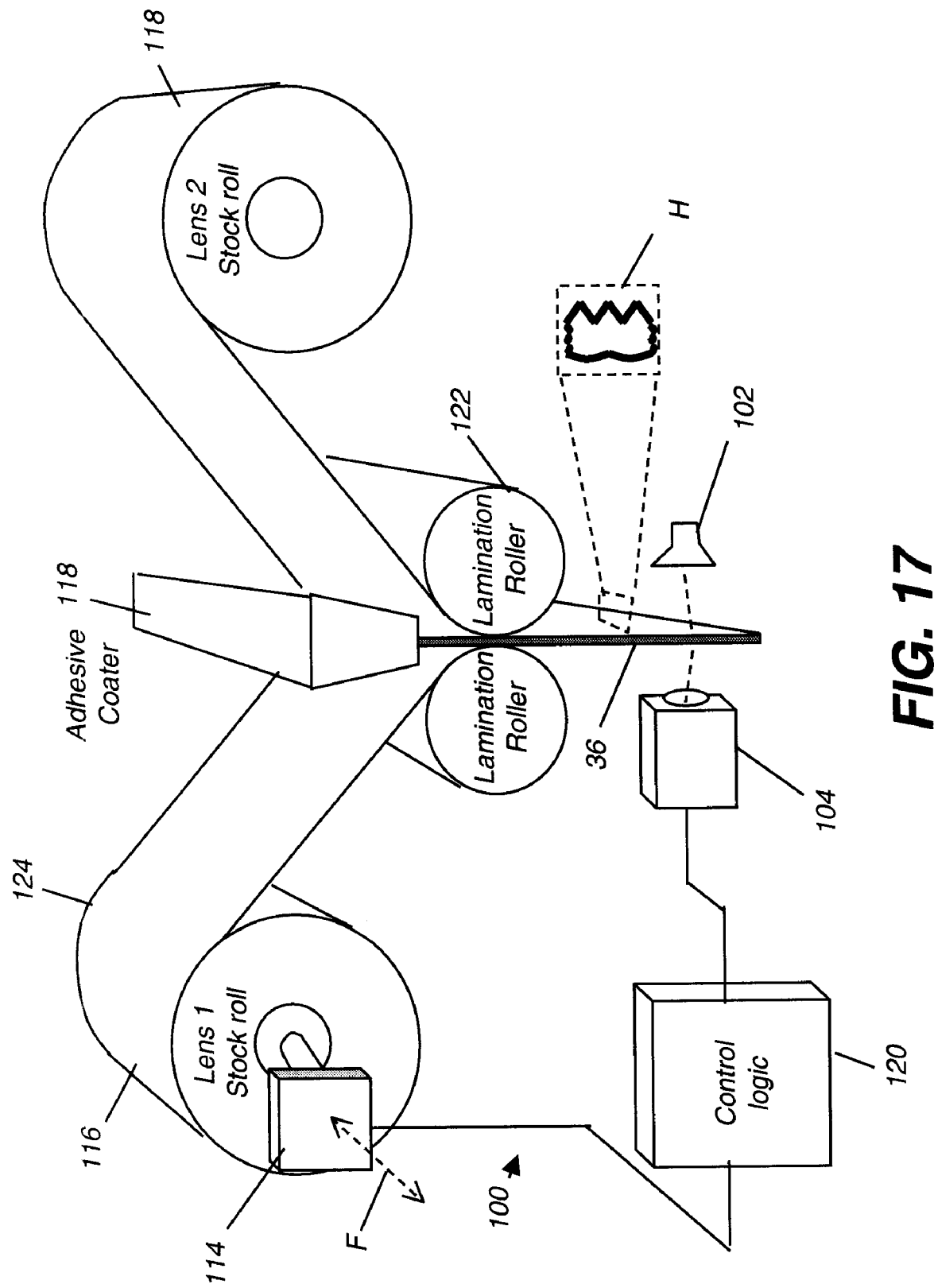
FIG. 17 shows a lamination process of the invention.

Referring to FIG. 17, there is shown an embodiment that uses lamination through heated rollers 122 for forming turning film 36 from two separate webs 116, 118. Each web 116 and 118 is separately formed to have microstructures on one side. An adhesive coater 124 applies the necessary adhesive for lamination. Here, control loop 100 again measures the performance of the fabricated turning film 36 and causes an axial adjustment of one or more rollers where necessary to correct for misalignment. Section H shows, in close-up, a view from the end of turning film 36, showing prismatic and lenticular structures. Axial translator 114 in this embodiment shifts a roller 124 in axial direction F in order to effect alignment. Alternately, axial translator 114 could shift laminator roller 122 or some other roller that is capable of shifting the lateral position of web 116.

In another embodiment, using the basic arrangement of FIG. 16, web 106 is already provided with one surface that is featured, such as with lenticular elements 26 already formed, such as by embossing, curing, or other technique. The opposite side of web 106 is then featured by means of patterned roller 108 in an extrusion or embossing process. As with other embodiments, control loop 100 monitors the light-handling behavior of the fabrication turning film 36 and uses axial translator 114 in order to shift patterned drum 108 along its axis.

Figure 18:
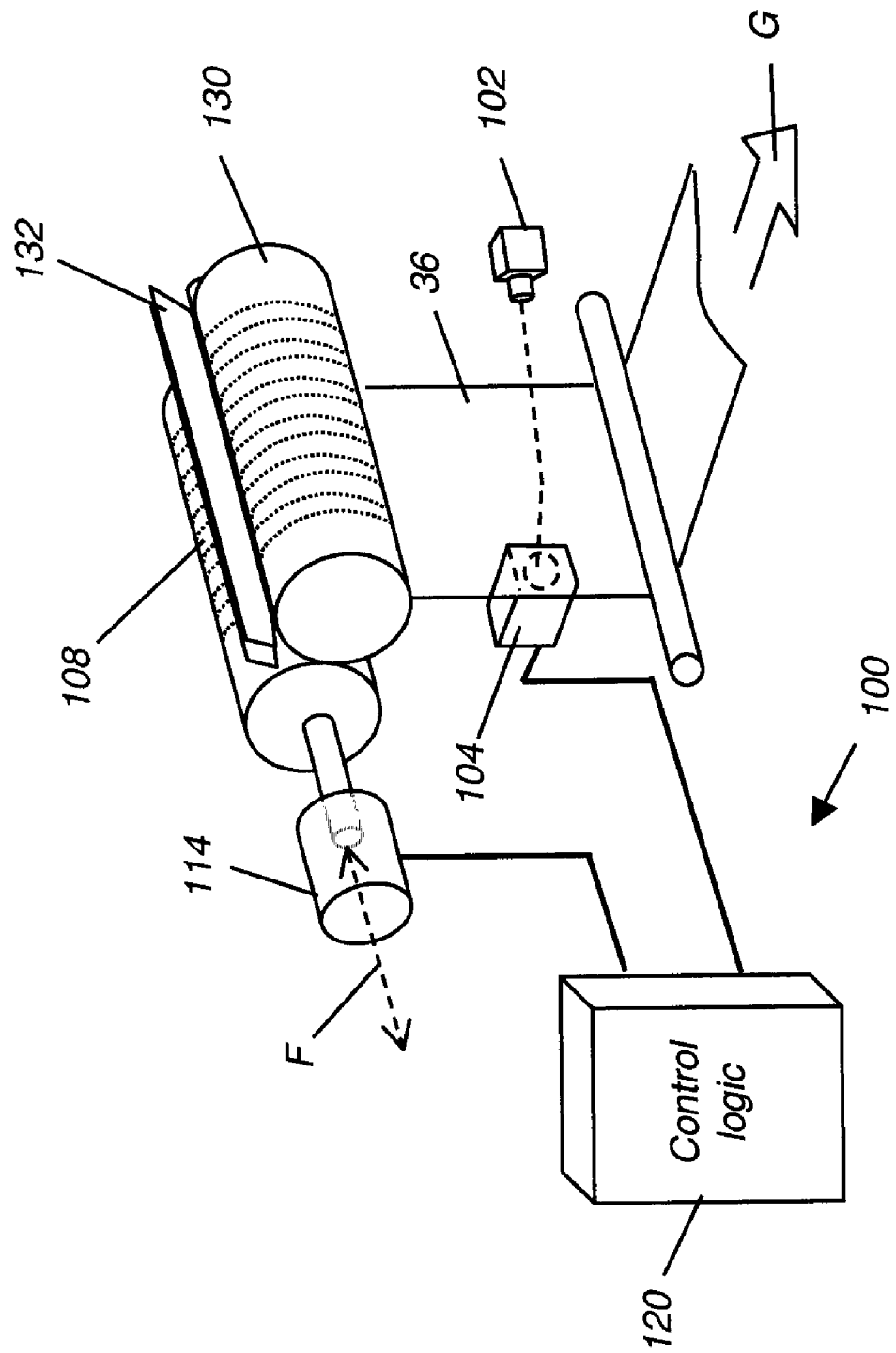
FIG. 18 shows a carrierless extrusion process of the invention, used to form two patterns at the same time.

In yet another embodiment, an extrusion process is used to provide the prismatic and lenticular features simultaneously. This has the advantage of not requiring a separate carrier material, since the web substrate is itself formed in this process. Referring to FIG. 18, this process is shown in simplified schematic form. Molten material from an extrusion die 132, forming a melt curtain at a controlled rate, is fed into the nip between opposed patterned rollers 108 and 130. One of patterned rollers 130 is in fixed axial position; the other patterned roller 108 is movable along axial direction F, as shown. The pattern formed on each side is extended in the machine direction, that is, in the direction of film travel, G. As the material is cooled to at least around its glass transition temperature, it is stripped from patterned rollers 108 and 130. The embodiment of FIG. 18 could also be used with a carrier material, so that the carrier substrate is fed into the nip formed between rollers 108 and 130 and molten material applied to each side.

Figure 19:
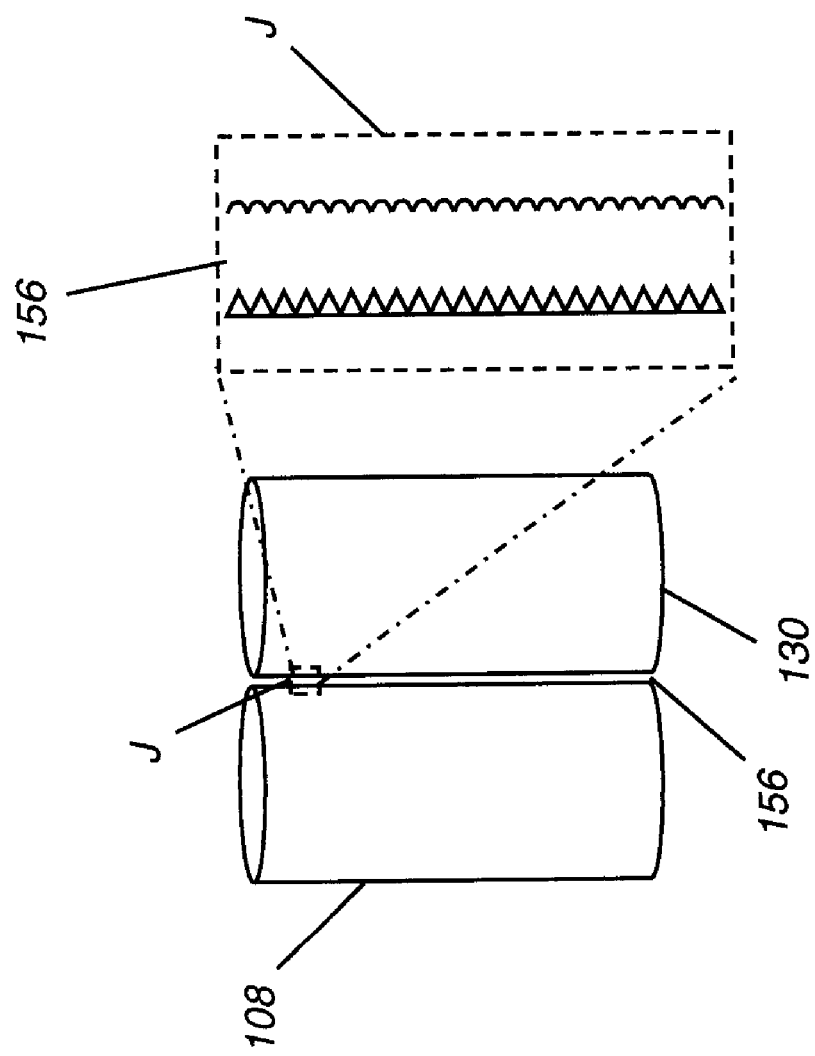
FIG. 19 shows featured rollers used in one embodiment of the invention.

FIG. 19 shows, from a top view and exaggerated in scale, a nip 156 between patterned rollers 108 and 130 in an enlarged portion J. In this example, patterned roller 130 forms lenticular elements 26. Patterned roller 108 forms prismatic structures 24.

Figure 20A:
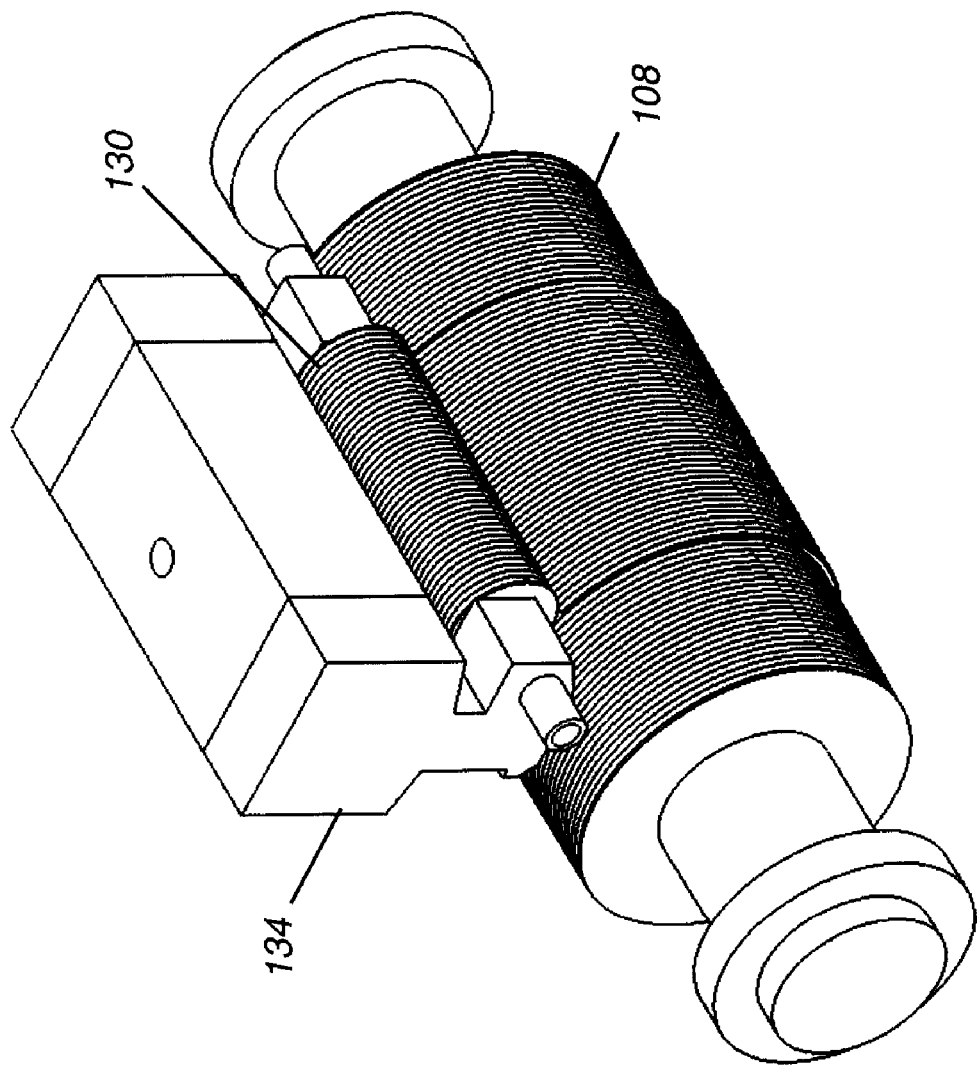
FIG. 20A is a perspective view showing fabrication of the turning film of the present invention in one embodiment using featured drums.

FIGS. 20A through 20E show different views of an embodiment using a radial contact extrusion die, as disclosed in commonly-assigned copending U.S. Patent Application Serial No. US2004786858A cited earlier. This embodiment follows the same basic pattern for simultaneous feature formation shown in FIG. 18, and adds benefits including improved speed and suitability for use in forming films having steep prismatic features. FIG. 20A is a perspective view showing a radius die 134 that provides molten material onto patterned drum 108, whose patterning features extend circumferentially about the drum 108 cylinder, rather than extending in parallel to the drum axis as with conventional systems. Similarly, features on patterned drum 130 also extend circumferentially, rather than axially.

Figure 20C:
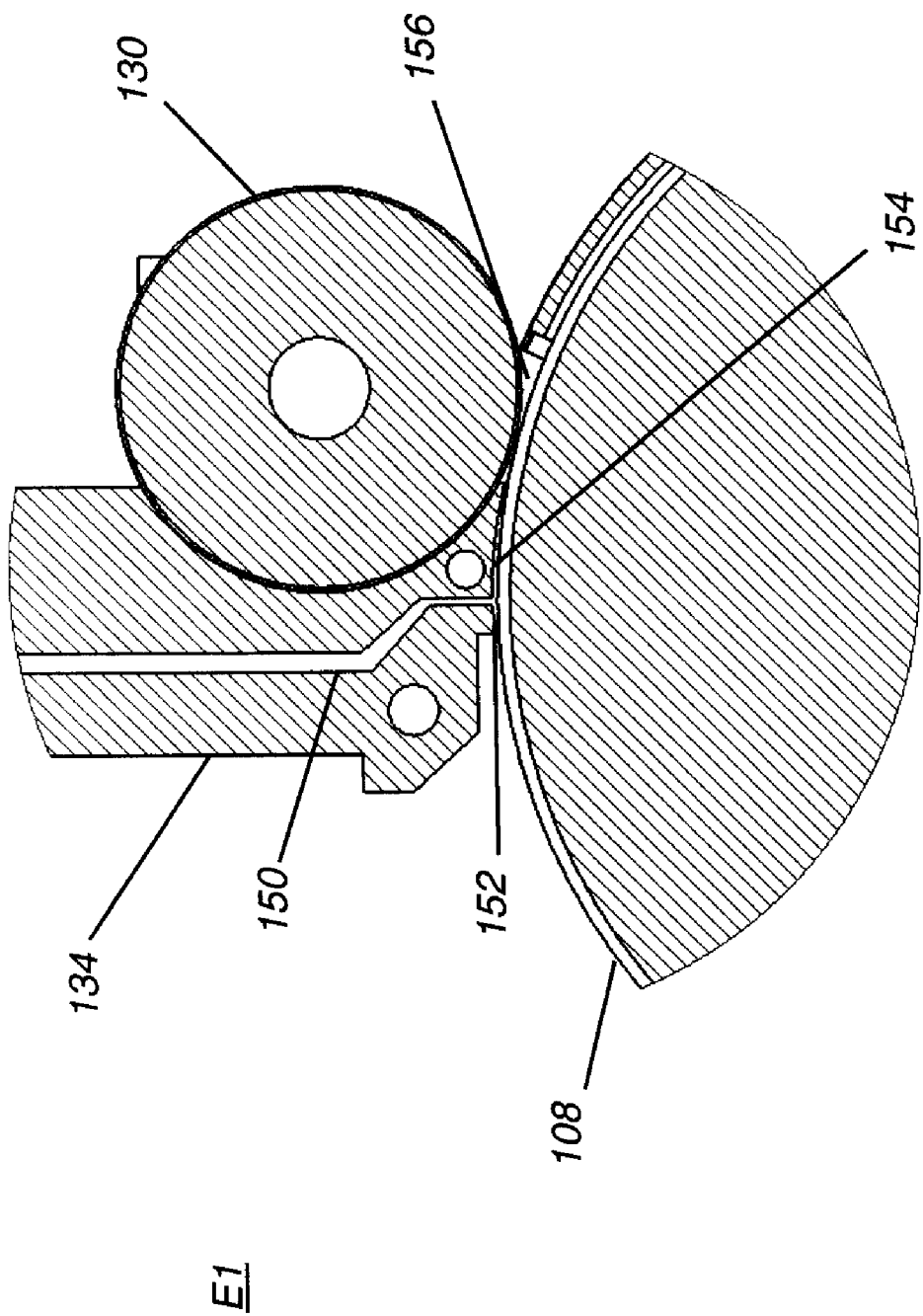
FIG. 20C is an enlarged view of interface portions of the apparatus of FIG. 20A.
Figure 20D:
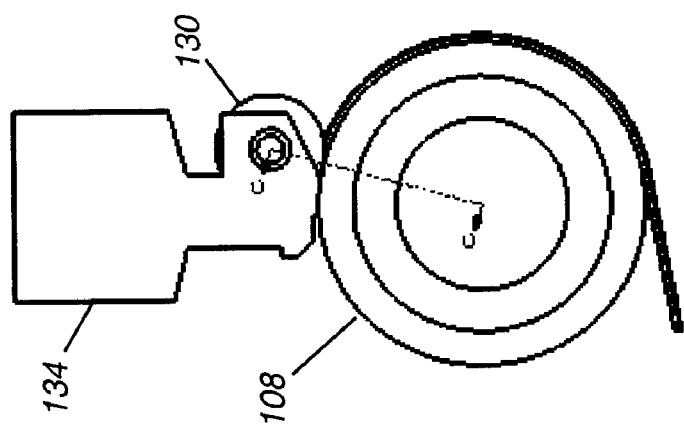
FIGS. 20D and 20E are sectioned and enlarged views respectively of the nip interface between featured rollers as shown in FIG. 20A.
Figure 20D:
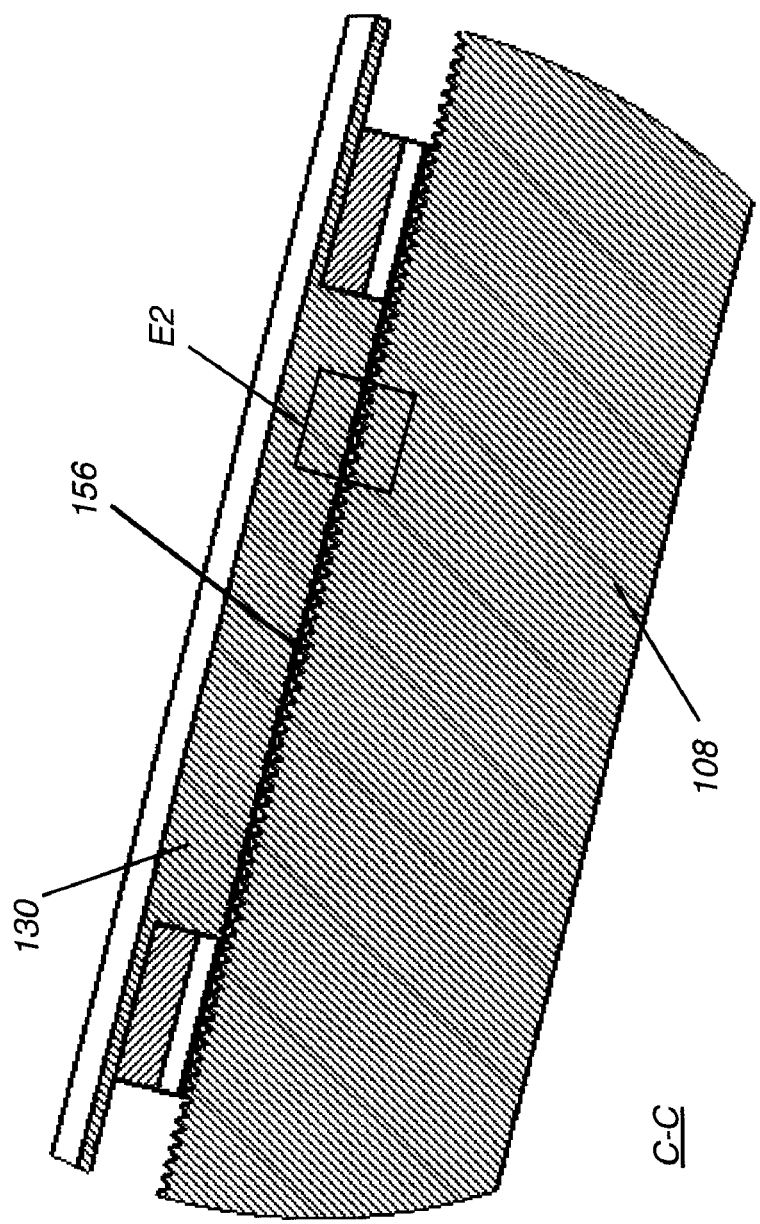
Figure 20E:
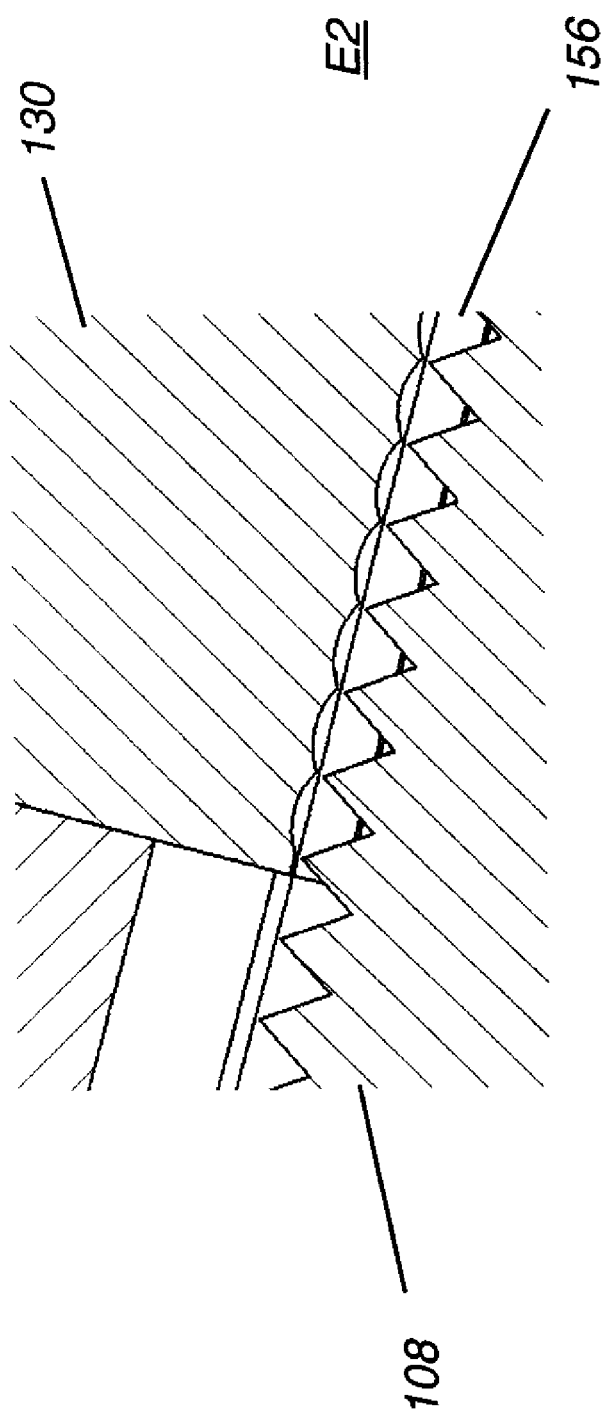

Referring to the cross-sectional view of FIG. 20B and enlarged area E1 in FIG. 20C, radius die 134 directs molten material through a cavity 150 that extends the length of a slot that roughly corresponds to the width of the web. The molten material, forced through first and second land areas 152 and 154 is forced into the surface of patterned drum 108, which forms the prismatic structures 24 in this embodiment. While the material is still soft, patterned drum 130, forming a nip 156 with patterned drum 108 as is shown in detail in the partial cutaway view of FIG. 20D and enlarged area E2 of FIG. 20E, then forms lenticular features on the opposite side of the material. As the material travels from the nip, it cools and forms turning film 36 in carrierless fashion.

The embodiment of FIGS. 20A through 20E has advantages for compactness and its capability for forming the relatively pronounced features of prismatic structures 24, replicated from patterned roller 108. This embodiment forms a continuous web, not requiring that a carrier substrate be supplied. Control loop 100 is also used with the embodiment of FIG. 20; however, only axial translator 114 is shown, represented in dotted outline.

Figure 21:
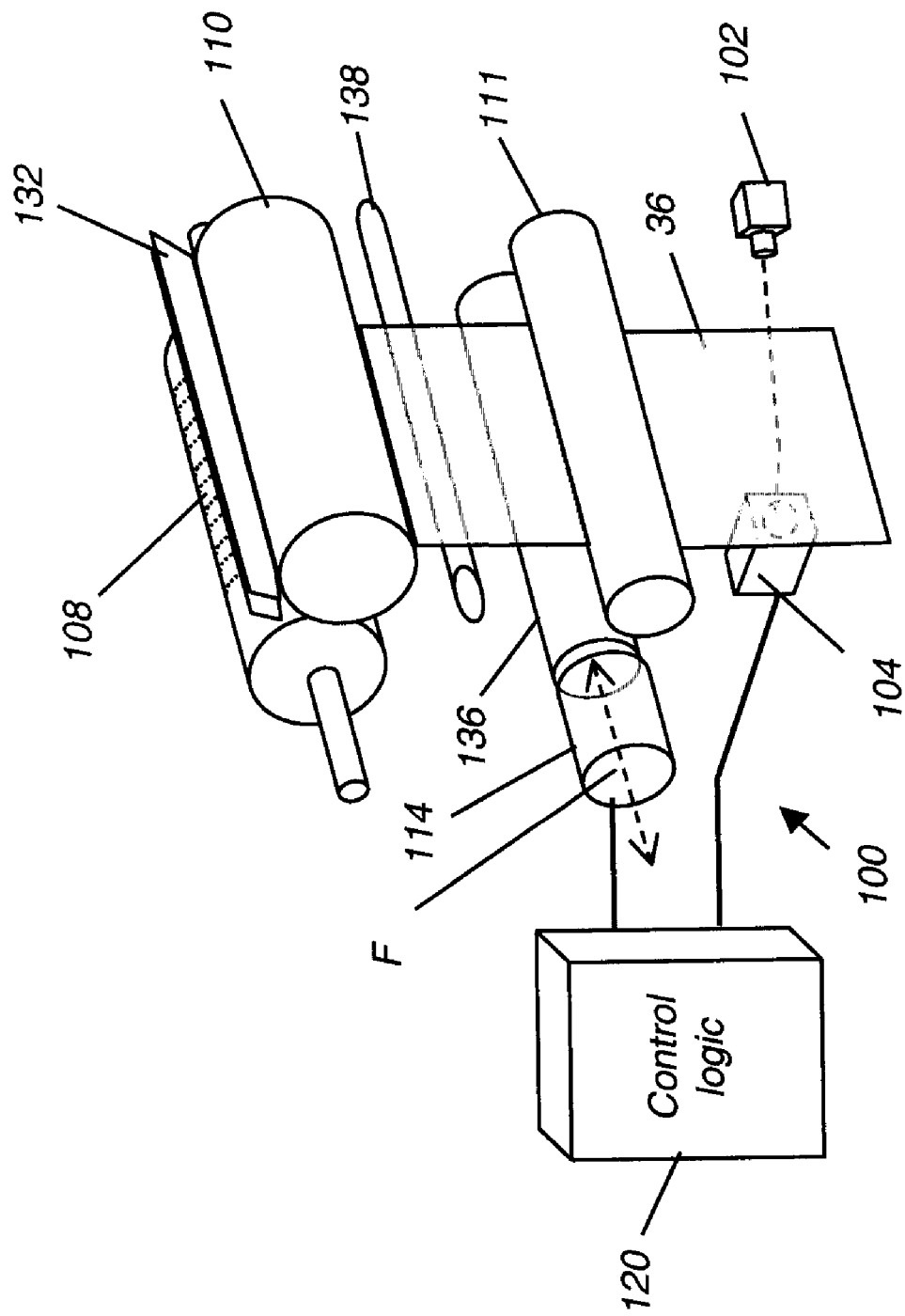
FIG. 21 illustrates a two-step process of the invention using extrusion and embossing stages.

In an alternate embodiment, shown in FIG. 21, extrusion and embossing processes are used separately. As a first stage, extrusion uses patterned roller 108 paired with opposing roller 110. This forms a film having prismatic structures 24 on one side. The film is then heated by a heating element 138 and goes to an embossing roller 136, having an opposing roller 111. This arrangement provides the advantage of segmenting the fabrication process, which may make it easier to provide the needed adjustments. Axial translator 114 is positioned to shift embossing roller 136; alternately, axial translator 114 could alternately shift patterned roller 108.

Figure 22:
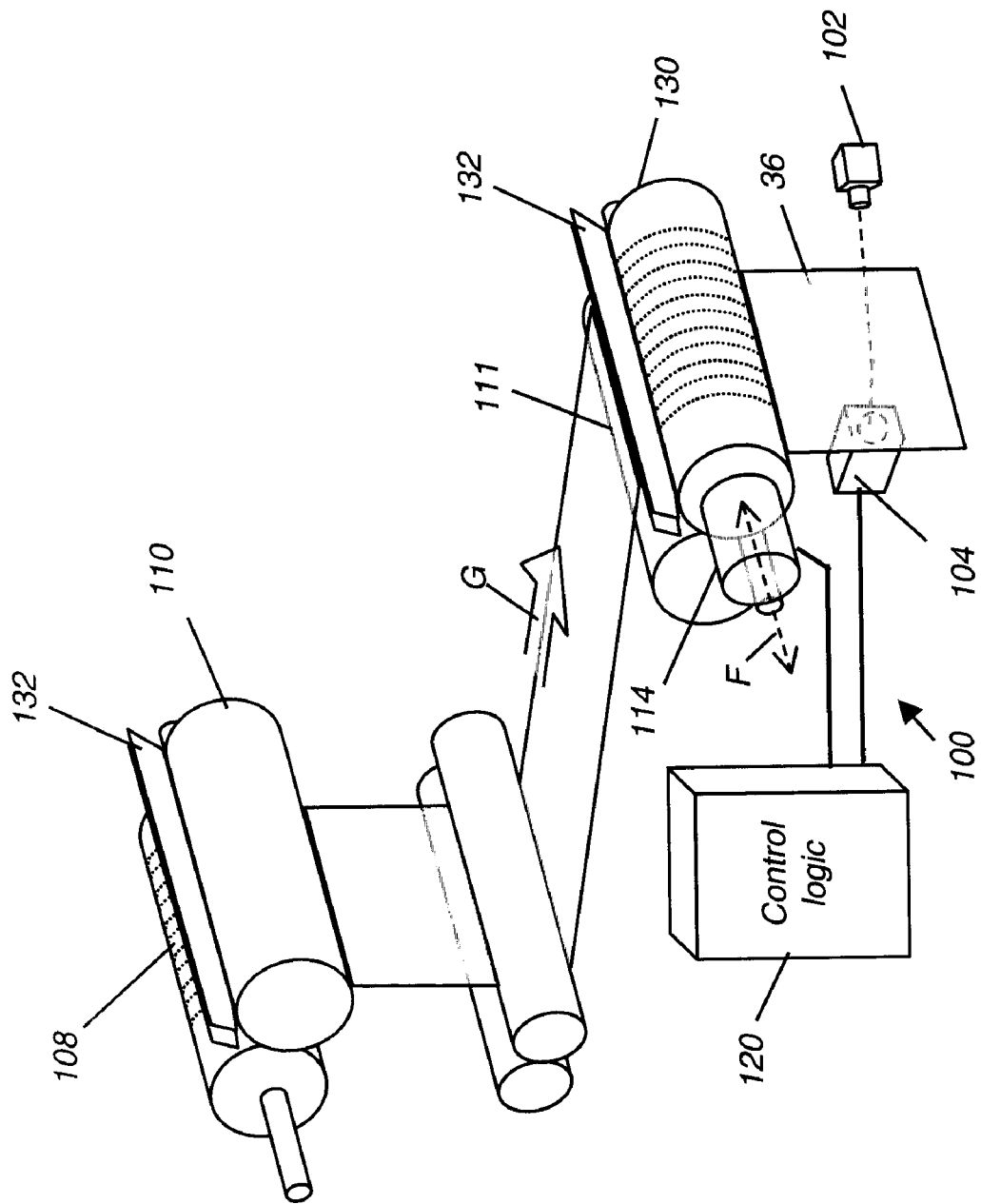
FIG. 22 shows a two-step process of the invention forming each patterned side separately.

FIG. 22 shows another alternate carrierless embodiment that uses a two-step extrusion process. Molten material from extrusion die 132 is fed into the nip between patterned roller 108 and opposing roller 110. This forms web 106, with the pattern on one side of the film. Web 106 is then forwarded in direction G to another extrusion die 132 at a nip between patterned roller 130 and opposing roller 111. This forms the pattern on the opposite side of web 106, thus forming turning film 36. Axial translator 114, controlled by control loop 100, is then used to shift patterned roller 130 along axial direction F. Alternately, the position of web 106 can be shifted prior to reaching the nip between rollers 130 and 111.

Figure 23:
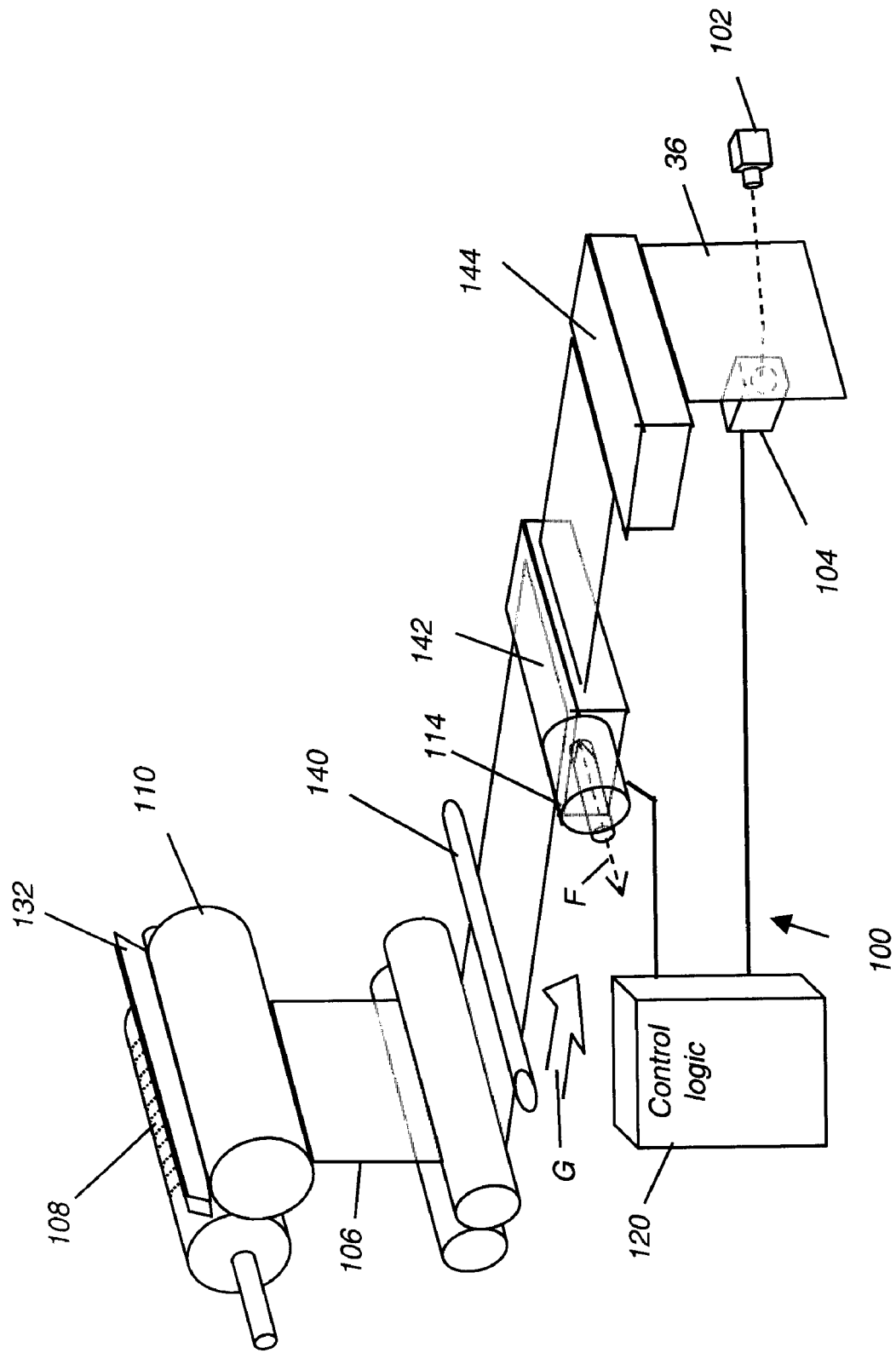
FIG. 23 shows a two-step process of the invention forming the turning film of the present invention using a combination of extrusion and photoresist processes.

Referring to FIG. 23, there is shown an alternate embodiment for turning film 36 fabrication that combines extrusion with photoresist techniques. Molten material from extrusion die 132 is fed into the nip between patterned roller 108 and opposing roller 110. This forms web 106, with the pattern on one side of the film; the other side of the film is smooth. Web 106 is then forwarded to a photoresist coater 140 that applies photoresist material to the smooth side of web 106, in a manner familiar to those skilled in the optical film fabrication arts. The pattern on the coated side is then exposed at an exposure station 142. A wash station 144 is then used for final development and removal of material as the last part of the photoresist process. Axial translator 114, controlled by control loop 100, can be used to shift the relative position of exposure station 142 in a direction orthogonal to web direction G. Optionally, control loop 100 may send a signal that causes a shift in exposure in the direction F.

It can be appreciated that patterning and curing using ultraviolet light or other suitable radiation can also be performed to obtain one or both patterned surfaces and can be used in combination with other techniques, such as extrusion, in any suitable order. For example, with respect to the arrangement of FIG. 23, exposure station 142 could be placed ahead of extrusion die 132, so that the UV patterned side is formed first.

Turning film 36 can be fabricated from a variety of transparent materials, over a range of thicknesses and of different flexibility.

Fabrication Examples

A fabrication apparatus similar to that shown in FIG. 18 was used to prepare turning film 36. For this apparatus, two steel rollers, each 5 inch diameter and 4¼ inch wide, served as patterned rollers 108 and 130. Each patterned roller was engraved to form the features described with reference to FIG. 5A, with R=75 μm, P=Q=50 μm, and α=β=34°. One roller had a prismatic structure and the other one had the lenticular structure. Both rollers had inner channels where cooling (or heating) oil can be fed through, so that the roller surface temperature can be controlled to a desired range. Oil flow to and from the rollers was through rotary unions that were connected to both ends of each roller.

Patterned rollers 108 and 130 were mounted to a machine. Patterned roller 108, for forming prismatic structures, was mounted on a pre-fixed driving shaft. Patterned roller 130, for forming lenticular structures, was mounted on a shaft that translates under pressure provided through two hydraulic cylinders, one mounted on each side of this shaft. These two rollers were leveled and formed a vertical lamination nip. An extruder and its die were mounted above the lamination nip, as shown in FIG. 18.

Polycarbonate was extruded at 310 degree C. from the extruder die. The extruder die was moved to 2 inches above the lamination nip. The melt curtain position was adjusted so that the curtain dropped directly into the lamination nip. Temperature on patterned rollers 108 and 130 were set to 116° C. Casting wheel speed setting was 8 feet per minute.

At nip roller hydraulic pressure of 2.76 MPa (equivalent to unit nip force of 57617 N/m), a replicated depth of 28.3 um was achieved on the prismatic side. FIG. 24A shows these structures.

At nip roller hydraulic pressure of 4.14 MPa (equivalent to unit nip force of 86513 N/m), a deeper replicated depth of 33.5 um was achieved on the prismatic side, as shown in FIG. 24B.

At nip roller hydraulic pressure of 5.52 MPa (equivalent to unit nip force of 115409 N/m), a replicated depth of 29.0 um was achieved on the prismatic side, as shown in FIG. 24C. Good alignment between the front and back features was achieved.

At nip roller hydraulic pressure of 6.89 MPa (equivalent to unit nip force of 144305 N/m), a replicated depth of 31.6 um was achieved on the prismatic side, as shown in FIG. 24D.

In summary, at all hydraulic pressures used, excellent lenticular feature replication was achieved. Replication quality appears to depend on proper settings for parameters such as speed, pressure, and temperature, and other parameters. Poor selection of these parameters can lead to disappointing results.

In further testing, more samples were produced in the same manner as just described for the examples of FIGS. 24A through 24D except with prismatic heating oil temperature was set to 107 degrees C., and the lenticular roller heating oil temperature set to 110 degrees C. The following listing shows hydraulic pressure settings and the resulting prismatic feature replication depth that was achieved:

At hydraulic pressure 2.76 MPa→21.6 um
At hydraulic pressure 5.52 MPa→27.6 um
At hydraulic pressure 4.14 MPa→25.9 um While web fabrication offers a number of advantages in manufacture, the turning film of the present invention could alternately be formed using injection molding.

Materials

The double-sided optical turning film of this invention can be effectively manufactured by a melt extrusion process. The polymeric material is melt extruded through a die and directed onto forming surfaces having the requisite micropatterns for both surfaces of the film. Materials most suitable for this application must be melt-extrudable, that is, compatible for melt extrusion and thermoformable, that is, suitable for thermoforming under appropriate temperatures while possessing the requisite optical, mechanical, and dimensional properties. Examples of such materials include, but are not limited to, polycarbonates, polyesters, polysulfones, polyethersulfones, and poly(cyclo-olefins). It is generally required that the glass transition temperature of the polymeric material exceed 80 degrees C. to insure that the film is dimensionally stable under typical use temperatures. It is also useful, though not necessary, that the material be non-crystalline to yield good optical transmission under nominal forming temperatures. It is also useful that the materials for forming the lenticular structures, the prismatic structures, and the core layer are different according to some of inventive processes for making the turning film. Especially, the material for the prismatic structures are preferred to have lower index of refraction than the one for the lenticular structures, so that light reflection off from the prismatic structures can be reduced and light transmission through the turning film can be enhanced. Additionally, hardness of the prismatic elements is preferred to be substantially equivalent to the hardness of light guide plate to reduce abrasion.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is a double sided turning film with predetermined off-shift registration between its two microstructures, display apparatus using this turning film, and a process for making such a turning film.

PARTS LIST

10. Light guiding plate
12. Light source
16. Output surface
18. Input surface
20. Light gating device
22. Turning film
24, 24a, 24b Prismatic structure
25. Core layer
26, 26a, 26b Lenticular element
28. Redirected light ray
29. Collimated light ray
30. Display apparatus
32. Side
36, 36a, 36b, 36c, 36d, 36e, 36f. Turning film
38. Incident light surface
40. Output surface
42. Reflective surface
45, 46, 48, 50, 54, 56, 58. Luminous intensity curve
51. Crosstalk portion
56, 56a. Apex
57, 57a. Groove
58 Flattened surface
64. Display apparatus
70. Prismatic structure
72, 72a, 72b. Lenticular element
74. Pair
100. Control loop
102. Light source
104. Light sensor
106. Web
108. Patterned roller
110, 111. Opposing roller
114. Axial translator
116, 118. Web
120. Control logic processor
122, 124. Roller
128. Adhesive coater
130. Patterned roller
132. Extrusion die
134. Radius die
136. Embossing roller
138. Heating element
140. Coater
142. Exposure station
144. Wash station
150. Cavity
152, 154. Land area
156. Nip
A, B, C Light ray
D Direction
E1, E2. Enlarged area
F Axial direction
G Arrow
H Section
J Enlarged portion
d thickness of core layer
$\alpha, \beta$ Peak half angle
N Normal of the light guiding plate 10 or turning film
P, Q Pitch
O Optical axis
R, R1, R2, R3 radius of curvature of lenticular elements
r radius of apex
T total thickness
X Offset dimension

The invention claimed is:

1. A backlight device for display comprising (1) a side-lit light source, (2) a light guide plate, and (3) a turning film comprising melt-extrudable and thermo-formable polymeric material, the turning film comprising prismatic structures on the light entry surface of the film and lenticular elements on the light exit surface of the film, wherein:

(a) the prismatic structures are characterized by an average apex angle ($\alpha+\beta$) and an average pitch (Q);
(b) the lenticular elements are characterized by an average pitch (P) and an average radius of curvature (R); and
(c) the prismatic structures and lenticular elements are out of registration by an average amount (X), and
(d) the film has average thickness (T);

provided that said averages are selected to provide a peak output angle of ±10° from normal to the light exit surface of the light guide plate and an optical gain of at least 1.25; and wherein the turning film value derived from the formula $$\frac{T}{P} - \frac{\cos^2\left(\frac{\alpha+\beta}{2}\right)}{\sin(\alpha+\beta)} - \left(\frac{R}{P} - \sqrt{\left(\frac{R}{P}\right)^2 - \frac{1}{4}}\right)$$

is in the range from 0 to about 5.5.

2. The device of claim 1 wherein the turning film comprises a polymer selected from the group consisting of carbonate, ester, sulfone, ethersulfone, and cyclo-olefin.

3. The device of claim 1 wherein at least one side of the prismatic structure is curved.

4. The device of claim 1 wherein the lens shape for the lenticular element, in cross section, is acircular.

5. The device of claim 1 wherein the prismatic structures vary in height.

6. The device of claim 1 wherein the turning film has an average pitch values P and Q are equal.

7. The device of claim 1 wherein the turning film apex angle is rounded and the apex has a radius less than about 0.26P.

8. The device of claim 1 wherein the turning film prismatic structures are extended along a serpentine path on the light entry surface.

9. The device of claim 1 wherein the turning film lenticular elements are extended along a serpentine path on the light exit surface.

10. The device of claim 1 wherein the index of refraction of material forming the turning film is in the range from 1.2 to 1.9.

11. The device of claim 1 wherein the average ratio X/P is in the range from about 0.05 to 0.30.

12. A backlight device for a display comprising (1) a side-lit light source, (2) a light guide plate and (3) a turning film comprising a light entry and a light exit surface comprising lenticular elements on the exit surface and prismatic structures on the entry surface, wherein
   (a) the prismatic structures are characterized by an apex angle ($\alpha+\beta$) and an average pitch (Q);
   (b) the lenticular elements are characterized by an average pitch (P) and an average radius of curvature (R); and
   (c) wherein the prismatic structures and lenticular elements are out of registration by an average amount X,
   (d) the thickness of the film is T;
   provided that the averages are selected to provide a peak output angle of ±10° of normal to the light exit surface of the light guide plate and an optical gain of at least 1.25; and wherein the turning film value derived from the formula $$\frac{T}{P} - \frac{\cos^2\left(\frac{\alpha+\beta}{2}\right)}{\sin(\alpha+\beta)} - \left(\frac{R}{P} - \sqrt{\left(\frac{R}{P}\right)^2 - \frac{1}{4}}\right)$$

is in the range from 0 to about 5.5.

13. The device of claim 12 wherein, for the turning film, both average pitch values P and Q are equal.

14. The device of claim 12 wherein, for the turning film, the apex angle is rounded and the apex has a radius less than about 0.26P.

15. The device of claim 12 wherein, for the turning film, at least one side of the elongated prismatic structure is curved.

16. The device of claim 12 wherein, or the turning film, the lens shape for the lenticular element, in cross-section, is acircular.

17. The device of claim 12 wherein, for the turning film, the lens shape for the lenticular element, in cross-section, is substantially circular.

18. The device of claim 12 wherein, for the turning film, the ratio R/P is in the range from about 0.9 to 5.

19. The device of claim 12 wherein, for the turning film, the index of refraction for the material forming the turning film is in the range from 1.2 to 1.9.

20. The device of claim 12 wherein, for the turning film, the ratio average of X/P is in the range from about 0.05 to 0.30.

21. The device of claim 12 having a light entry and a light exit surface comprising lenticular elements on the exit surface and prismatic structures on the entry surface, wherein
   (a) the prismatic structures are characterized by an apex angle ($\alpha+\beta$) and an average pitch (Q);
   (b) the lenticular elements are characterized by an average pitch (P) and an average radius of curvature (R); and
   (c) wherein the prismatic structures and lenticular elements are out of registration by an average amount X,
   (d) the thickness of the film is T;
   provided that the averages of the angles and extent out of registration, are such that ($\alpha+\beta$) are in the range of 58 to 74° and the extent out of registration is such that ratio X/P is in the range of 0.05 to 0.30.

22. A display comprising the backlight of claim 1.

23. A display comprising the backlight of claim 12.

* * * * *